United States Patent
Hong et al.

(10) Patent No.: US 11,477,836 B2
(45) Date of Patent: Oct. 18, 2022

(54) METHOD FOR PERFORMING PATH RESELECTION IN WIRELESS COMMUNICATION SYSTEM AND APPARATUS THEREFOR

(71) Applicant: LG Electronics Inc., Seoul (KR)

(72) Inventors: Jongwoo Hong, Seoul (KR); Taehun Kim, Seoul (KR); Jaewook Lee, Seoul (KR); Sangwon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/499,711

(22) PCT Filed: Mar. 27, 2018

(86) PCT No.: PCT/KR2018/003596
§ 371 (c)(1),
(2) Date: Sep. 30, 2019

(87) PCT Pub. No.: WO2018/182286
PCT Pub. Date: Oct. 4, 2018

(65) Prior Publication Data
US 2020/0029384 A1 Jan. 23, 2020

Related U.S. Application Data

(60) Provisional application No. 62/479,185, filed on Mar. 30, 2017.

(51) Int. Cl.
*H04W 76/19* (2018.01)
*H04W 88/04* (2009.01)
(Continued)

(52) U.S. Cl.
CPC .......... *H04W 76/19* (2018.02); *H04W 36/03* (2018.08); *H04W 36/305* (2018.08);
(Continued)

(58) Field of Classification Search
CPC ..... H04W 36/03; H04W 36/34; H04W 36/38; H04W 76/14; H04W 76/19; H04W 76/23; H04W 88/04
See application file for complete search history.

(56) References Cited

U.S. PATENT DOCUMENTS

2011/0317552 A1 12/2011 Lee et al.
2013/0324114 A1 12/2013 Raghothaman et al.
(Continued)

FOREIGN PATENT DOCUMENTS

| KR | 101023529 | 3/2011 |
| KR | 20150022240 | 3/2015 |
| WO | WO2016164808 | 10/2016 |

OTHER PUBLICATIONS

Non-Final Office Action in U.S. Appl. No. 17/572,941, dated Mar. 21, 2022, 12 pages.
(Continued)

Primary Examiner — Kevin C. Harper
(74) Attorney, Agent, or Firm — Fish & Richardson P.C.

(57) ABSTRACT

The present specification provides a method for performing a radio link failure (RLF) recovery procedure in a wireless communication system.
The method performed by a first user equipment (UE) includes, wherein the first UE is connected to a base station via a UE-to-UMTS (Uu) link and is connected to a second UE via a sidelink, determining a path for performing the RLF recovery procedure when a RLF is detected on the Uu link, and performing an RRC connection re-establishment procedure in order to recover the RLF through the determined path.

5 Claims, 14 Drawing Sheets

(51) Int. Cl.
    *H04W 36/00*     (2009.01)
    *H04W 36/34*     (2009.01)
    *H04W 76/14*     (2018.01)
    *H04W 36/30*     (2009.01)
    *H04W 36/36*     (2009.01)
    *H04W 84/04*     (2009.01)

(52) U.S. Cl.
    CPC ........... *H04W 36/34* (2013.01); *H04W 36/36* (2013.01); *H04W 76/14* (2018.02); *H04W 88/04* (2013.01); *H04W 84/042* (2013.01)

(56) References Cited

U.S. PATENT DOCUMENTS

| | | | |
|---|---|---|---|
| 2015/0282107 | A1 | 10/2015 | Vrind et al. |
| 2016/0286374 | A1* | 9/2016 | Baghel .................. H04W 76/14 |
| 2016/0295494 | A1 | 10/2016 | Gulati et al. |
| 2017/0111754 | A1 | 4/2017 | Baghel et al. |
| 2018/0092017 | A1* | 3/2018 | Freda .................... H04W 36/03 |
| 2019/0141771 | A1 | 5/2019 | Ma et al. |

OTHER PUBLICATIONS

Final Office Action in U.S. Appl. No. 17/572,941, dated Jul. 1, 2022, 6 pages.

\* cited by examiner

FIG. 7
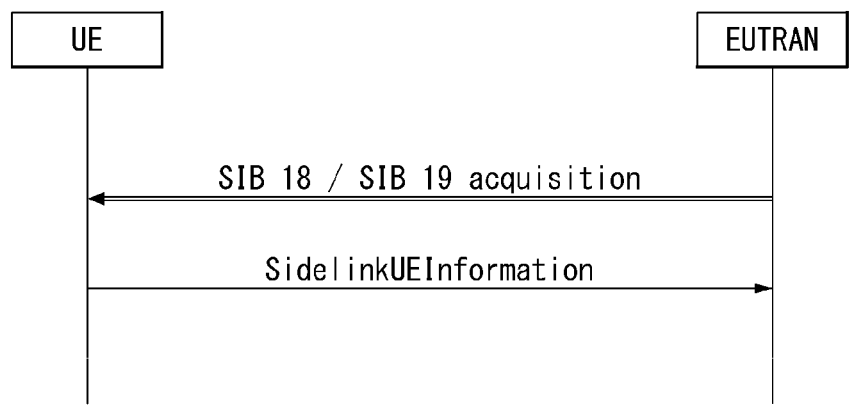
(a)
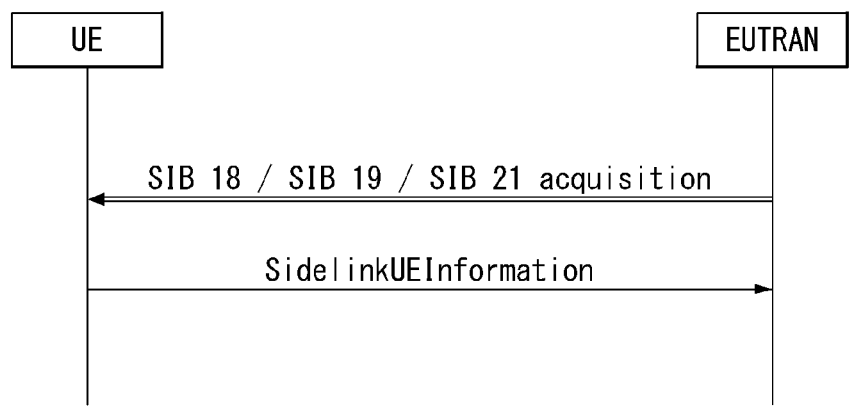
(b)

(a)            (b)

METHOD FOR PERFORMING PATH RESELECTION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/003596, filed on Mar. 27, 2018, which claims the benefit of U.S. Provisional Application No. 62/479,185, filed on Mar. 30, 2017, the contents of both are incorporated by reference herein in their entirety.

TECHNICAL FIELD

The present invention relates to a wireless communication system, and more particularly to a method for performing a path reselection and a device supporting the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

An object of the present specification is to provide a method for reselecting a path performing a radio link failure (RLF) recovery procedure when a RLF occurs on a UE-to-UMTS (Uu) link.

Another object of the present specification is to provide a method for reselecting a relaying path based on whether to support a service type, a congestion level of a hop, or the like.

Technical problems to be solved by the present invention are not limited by the technical problems mentioned above, and other technical problems which are not mentioned above can be clearly understood from the following description by those skilled in the art to which the present invention pertains.

Technical Solution

The present specification provides a method for performing, by a first user equipment (UE), a radio link failure (RLF) recovery procedure in a wireless communication system, the method comprising, wherein the first UE is connected to a base station via a UE-to-UMTS (Uu) link and is connected to a second UE via a sidelink, determining a path for performing the RLF recovery procedure when a RLF is detected on the Uu link; and performing an RRC connection re-establishment procedure in order to recover the RLF through the determined path, wherein the path for performing the RLF recovery procedure is determined based on a factor related to data characteristic of the first UE, wherein the determined path is the Uu link or the sidelink.

In the present specification, the factor related to the data characteristic of the first UE is a Qos class identifier (QCI), a packet delay budget, or a priority.

In the present specification, the method further comprises receiving, from the base station, a threshold for the factor related to the data characteristic of the first UE, wherein the path for performing the RLF recovery procedure is determined through a comparison between the factor related to the data characteristic of the first UE and the received threshold.

In the present specification, when the determined path is the sidelink, the RRC connection re-establishment procedure further comprises sending, to the second UE, a request message for requesting a RRC connection re-establishment; and receiving, from the second UE, a response message to the request message.

In the present specification, the first UE is a remote UE, and the second UE is a relay UE.

The present specification provides a method for reselecting, by a first node, a relaying path in a wireless communication system, the method comprising, wherein the first node is connected to a second node via a UE-to-UMTS (Uu) link, transmitting and receiving data with one or more nodes via the Uu link; reselecting the relaying path when a radio link failure (RLF) is detected on the Uu link or a specific condition is met; and transmitting and receiving data with at least one node through the reselected relaying path, wherein the specific condition is whether to support a 5G Qos indicator (5QI) level on a node, whether to support a specific service type on the node, a congestion level of a hop, or a beam state.

In the present specification, the method further comprises, when the relaying path is reselected using a distributed manner, exchanging assistance information with the at least one node.

In the present specification, the assistance information is exchanged periodically or in an event triggered manner.

In the present specification, when the RLF is not detected on the Uu link, the relaying path is reselected depending on the specific condition.

In the present specification, the specific service type is enhanced multimedia broadband (eMBB), ultra reliable low latency communication (URLLC), or massive IoT (MIoT).

In the present specification, the first node is a relay node, and the second node is a donor node. The second node is connected to a 5th generation core network.

The present specification provides a first user equipment (UE) for performing a radio link failure (RLF) recovery procedure in a wireless communication system, the first UE comprising a radio frequency (RF) module configured to transmit and receive a radio signal; and a processor functionally connected to the RF module, wherein the first UE is connected to a base station via a UE-to-UMTS (Uu) link and is connected to a second UE via a sidelink, wherein the processor is configured to determine a path for performing the RLF recovery procedure when a RLF is detected on the Uu link; and perform an RRC connection re-establishment procedure in order to recover the RLF through the determined path, wherein the path for performing the RLF recovery procedure is determined based on a factor related to data characteristic of the first UE, wherein the determined path is the Uu link or the sidelink.

Advantageous Effects

The present specification has an effect capable of implementing transmission and reception of data suitable for 5G requirements by applying parameters related to a service flow considered in a next generation communication system such as 5G as well as RSRP to thereby reselect a path.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, which are included to provide a further understanding of the present invention and constitute a part of the detailed description, illustrate embodiments of the present invention and together with the description serve to explain the principle of the present invention.

FIG. 7 illustrates an example of a method of informing a base station of a sidelink RAT type proposed by the present specification.

MODE FOR INVENTION

Figure 1:
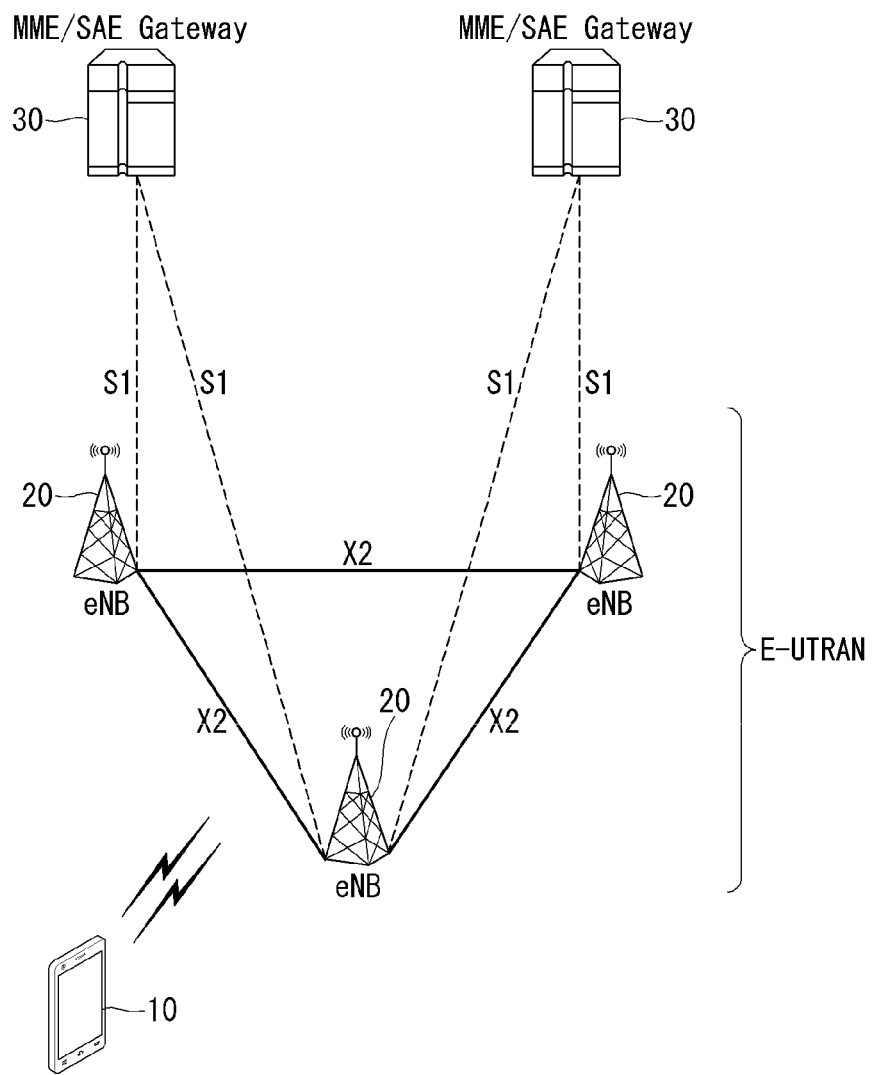
FIG. 1 illustrates an example of a network structure of an evolved universal terrestrial radio access network (E-UTRAN) to which the present invention is applicable.

In what follows, preferred embodiments according to the present invention will be described in detail with reference to appended drawings. The detailed descriptions given below with reference to appended drawings are intended only to provide illustrative embodiments of the present invention and do not represent the only embodiments thereof. The detailed descriptions of the present invention below include specific details for the purpose of comprehensive understanding of the present invention. However, those skilled in the art may readily understand that the present invention can be implemented without those specific details.

For some case, in order to avoid inadvertently making the technical concept of the present invention obscured, the structure and the apparatus well-known to the public can be omitted or illustrated in the form of a block diagram with respect to essential functions of the structure and the apparatus.

A base station in this document is defined as a terminal node of a network which carries out communication directly with a terminal. Particular operations in this document described to be carried out by a base station may be carried out by an upper node of the base station depending on the situation. In other words, it is evident that in a network consisting of a plurality of network nodes including a base station, various operations carried out for communication with terminals can be carried out the base station or other network nodes other than the base station. The term of base station (BS) can be substituted for by those terms such as fixed station, Node B, evolved-NodeB (eNB), base transceiver system (BTS), and access point (AP). Also, a terminal may be stationary or mobile and can be referred to by different terms such as a User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, and Device-to-Device (D2D) device.

In what follows, downlink transmission denotes communication from the BS to the UE, and uplink transmission denotes communication from the UE to the BS. In the downlink transmission, a transmitter can be a part of the BS while a receiver can be a part of the UE. In the uplink transmission, a transmitter can be a part of the UE while a receiver can be a part of the base station.

Particular terms used in the descriptions below are introduced to help understand the present invention and can be modified in various other ways as long as a modified use thereof does not depart from the technical principles and concept of the present invention.

Technologies described below can be used by various wireless access systems based on the scheme such as CDMA (code division multiple access), FDMA (frequency division multiple access), TDMA (time division multiple access), OFDMA (orthogonal frequency division multiple access), SC-FDMA (single carrier frequency division multiple access), and NOMA (non-orthogonal multiple access). The CDMA scheme can be implemented by a radio technology such as universal terrestrial radio access (UTRA) and CDMA2000. The TDMA scheme can be implemented by a radio technology such as global system for mobile communications (GSM), general packet radio service (GPRS), and enhanced data rates for GSM evolution (EDGE). The OFDMA scheme can be implemented by such as radio technology as defined by the IEEE 802.11 (Wi-Fi), IEEE 802.16 (WiMAX), IEEE 802.20, and evolved UTRA (E-UTRA). The UTRA is a part of standards specifying the universal mobile telecommunications system (UMTS). The 3rd generation partnership project (3GPP) long term evolution (LTE) is a part of standards of the evolved UMTS (E-UMTS) employing the E-UTRA, employing the OFDMA scheme for downlink transmission and the SC-FDMA scheme for uplink transmission. The LTE-A (Advanced) is an enhancement of the 3GPP LTE standard.

The embodiments of this document can be supported by at least one of the standard specifications for wireless access systems such as the IEEE 802, 3GPP, and 3GPP2. In other words, the standard specifications can be used to support those steps or parts among the embodiments of the present invention not explicitly described in favor of clarifying the technical principles thereof. Also, for technical definitions of the terms used in this document, the standard documents should be consulted.

For the purpose of clarity, this document is described based on the 3GPP LTE/LTE-A standard; however, it should be understood that the present invention is not limited to the specific standard.

FIG. 1 illustrates an example of a network structure of an evolved universal terrestrial radio access network (E-UTRAN) to which the present invention is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 1, an E-UMTS network includes an E-UTRAN, an EPC, and one or more UEs. The E-UTRAN consists of eNBs that provide control plane and user plane protocol to the UE, and the eNBs are interconnected with each other by means of the X2 interface.

X2 user plane (X2-U) interface is defined between the eNBs. The X2-U interface provides non-guaranteed delivery of a user plane packet data unit (PDU). X2 control plane (X2-CP) interface is defined between two neighboring eNBs. The X2-CP performs functions of context delivery between the eNBs, control of user plane tunnel between a source eNB and a target eNB, delivery of handover-related messages, uplink load management, and the like.

The eNB is connected to the UE via a radio interface and is connected to evolved packet core (EPC) by means of the S1 interface.

S1 user plane (S1-U) interface is defined between the eNB and a serving gateway (S-GW). S1 control plane interface (S1-MME) is defined between the eNB and a mobility management entity (MME). The S1 interface performs functions of evolved packet system (EPS) bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, access stratum (AS) security control, inter-core network (CN) node signaling for supporting mobility between 3GPP access networks, idle mode UE reachability (including control and execution of paging retransmission), tracking area identity (TAI) management (for UE in idle and active modes), PDN GW and SGW selection, MME selection for handover with MME change, SGSN selection for handover to 2G or 3G 3GPP access networks, roaming, authentication, bearer management functions including dedicated bearer establishment, support of public warning system (PWS) (including earthquake and tsunami warning system (ETWS) and commercial mobile alert system (CMAS)) message transmission, and the like.

Figure 2:
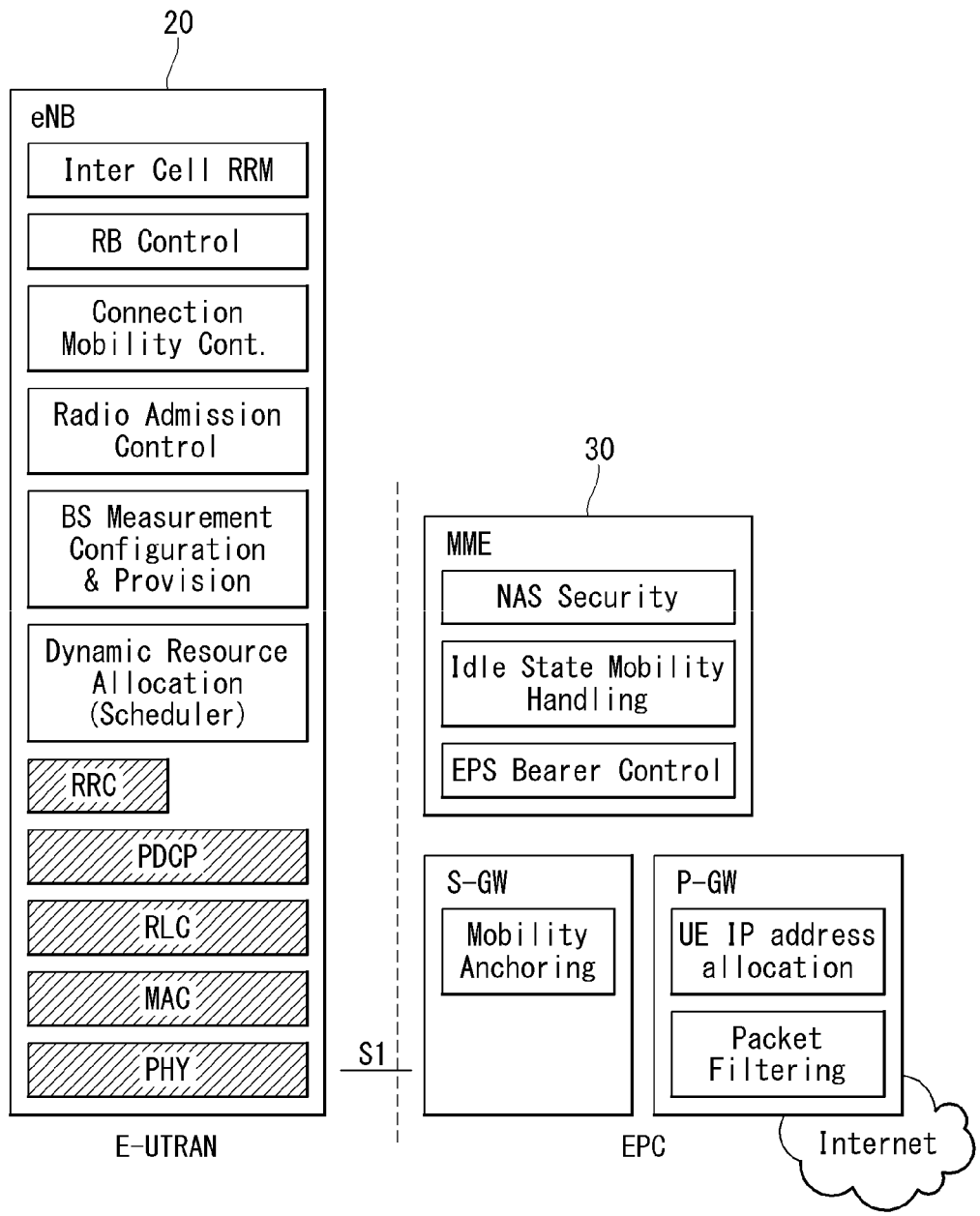
FIG. 2 illustrates structures of an E-UTRAN and an EPC in a wireless communication system to which the present invention is applicable.

FIG. 2 illustrates structures of an E-UTRAN and an EPC in a wireless communication system to which the present invention is applicable.

Referring to FIG. 2, an eNB may perform functions of selection of gateway (e.g., MME), routing to gateway during radio resource control (RRC) activation, scheduling and transmission of broadcast channel (BCH), dynamic resource allocation to the UE in uplink and downlink, and mobility control connection in LTE ACTIVE state. As described above, the gateway in the EPC may perform functions of paging origination, LTE IDLE state management, ciphering of user plane, bearer control of system architecture evolution (SAE), and ciphering and integrity protection of NAS signaling.

Figure 3:
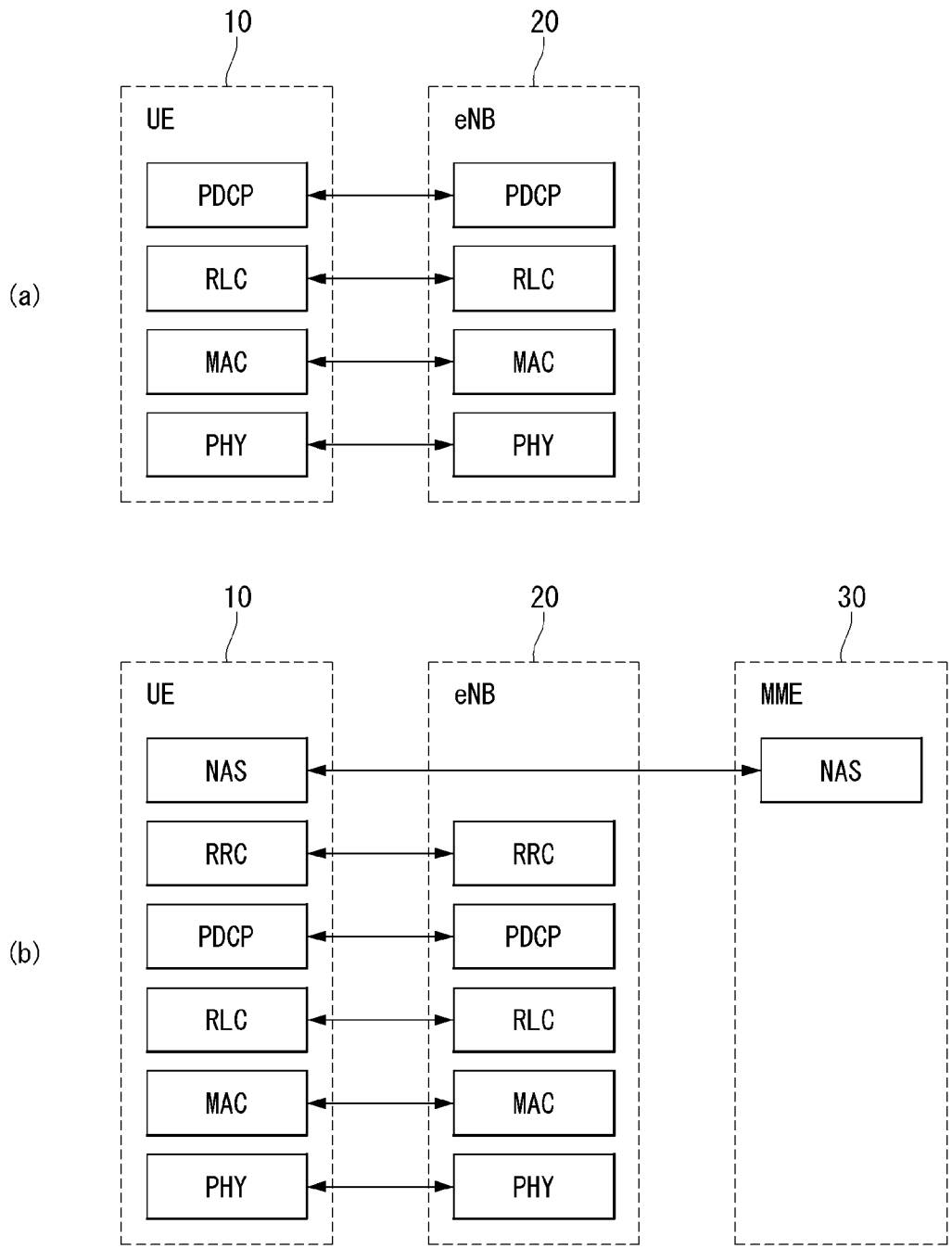
FIG. 3 illustrates a radio interface protocol structure between a UE and an E-UTRAN in a wireless communication system to which the present invention is applicable.

FIG. 3 illustrates a radio interface protocol structure defined between a UE and an E-UTRAN in a wireless communication system to which the present invention can be applied.

FIG. 3(a) illustrates a radio protocol structure of a control plane, and FIG. 3(b) illustrates a radio protocol structure of a user plane.

With reference to FIG. 3, layers of a radio interface protocol between the UE and the E-UTRAN can be classified into a first layer (L1), a second layer (L2), and a third layer (L3) based on the lower three layers of the open system interconnection (OSI) model that is well-known in the communication system technology field. The radio interface protocol between the UE and the E-UTRAN is divided horizontally into a physical layer, a data link layer, and a network layer; and divided vertically into a user plane which is a protocol stack for data information transmission and a control plane which is a protocol stack for transmission of a control signal.

The control plane refers to a path along which control messages for the UE and the network to manage calls are transmitted. The user plane refers to a path along which data created in the application layer, for example, voice data or Internet packet data are transmitted. In what follows, the control plane and the user plane of the radio protocol will be described.

The physical (PHY) layer belonging to the first layer provides an information transfer service to an upper layer by using a physical channel. The PHY layer is connected to the medium access control (MAC) layer belonging to the upper layer through a transport channel, and data are transferred between the MAC layer and the PHY layer through the transport channel. The transport channel is classified according to how and with what characteristics data are transferred through a radio interface. And a physical channel is employed to transfer data between disparate physical layers and between a physical layer of a transmitter end and a physical layer of a receiver end. The physical layer is modulated by OFDM scheme and uses time and frequency as radio resources.

There are a few physical control channels used in the physical layer. A physical downlink control channel (PDCCCH) informs the UE of a paging channel (PCH), resource allocation of a downlink shard channel (DL-SCH), and hybrid automatic repeat request (HARQ) information related to an uplink shared channel (UL-SCH). Also, the PDCCH can carry an uplink grant which informs the UE of resource allocation for uplink transmission. A physical control format indicator channel (PDFICH) informs the UE of the number of OFDM symbols used for the PDCCHs and is transmitted for each subframe. A physical HARQ indicator channel (PHICH) carries a HARQ acknowledge (ACK)/non-acknowledge (NACK) signal in response to the uplink transmission. A physical uplink control channel (PUCCH) carries requests scheduling of the HARQ ACK/NACK signal for downlink transmission and carries uplink control information such as a channel quality indicator (CQI). A physical uplink shared channel (PUSCH) carries an UL-SCH.

The MAC layer of the second layer (L2) provides a service to its upper layer, radio link control (RLC), layer, through a logical channel. Functions of the MAC layer includes mapping between a logical channel and a transport channel; and multiplexing/demultiplexing of transport blocks provided to a physical channel on a transport channel of a MAC service data unit (SDU) belonging to the logical channel.

The RLC layer of the second layer (L2) supports reliable transmission of data. Functions of the RLC layer include concatenation, segmentation, and reassembly of the RLC SDU. To ensure various levels of quality of service (QoS) that a radio bearer (RB) requests, the RLC layer provides three operating modes: transparent mode (TM), unacknowledged mode (UM), and acknowledge mode (AM). The AM RLC provides error correction through an automatic repeat request (ARQ). Meanwhile, in case the MAC layer carries the RLC function, the RLC layer can be included as a functional block of the MAC layer.

A packet data convergence protocol (PDCP) layer of the second layer (L2) carries functions of transfer of user data in the user plane, header compression, and ciphering. The header compression refers to the function of reducing the size of the IP packet header which carries relatively large and unnecessary control information so that Internet protocol (IP) packets such as the Internet protocol version 4 (IPv4) or the Internet protocol version 6 (IPv6) can be transmitted efficiently through a radio interface with narrow bandwidth. Functions of the PDCP layer in the control plane include transfer of plane data and ciphering/integrity protection.

The radio resource control (RRC) layer located in the lowest part of the third layer (L3) is defined only in the control plane. The RRC layer controls radio resources between the UE and a network. To this end, the UE and the network exchanges RRC messages through the RRC layer. The RRC layer controls a logical channel, a transport channel, and a physical channel related to configuration, re-configuration, and release of radio bearers. A radio bearer refers to a logical path that the second layer (L2) provides for data transmission between the UE and the network. Configuring a radio bearer indicates that a radio protocol layer and channel characteristics are defined for providing a particular service and specific parameters and an operating method thereof are set up. A radio bearer is again divided into a signaling RB (SRB) and a data RB (DRB). The SRB is used as a path for transmitting RRC messages in the control plan, and the DRB is used as a path for transmitting user data in the user plane.

The non-access stratum (NAS) layer located in the upper hierarchy of the RRC layer performs the function of session management, mobility management, and so on.

A cell constituting an eNB has bandwidth chosen from among 1.25, 2.5, 5, 10, 2 MHz and provides a downlink or an uplink transmission service to UEs. Bandwidth configuration can be carried out so that different cells have bandwidth different from each other.

Downlink transport channels for transporting data from a network to a UE include a broadcast channel (BCH) which transmits system information, a PCH which transmits a paging message, a DL-SCH which transmits user traffic or a control message. Downlink multicast or broadcast service traffic or a control message may be transmitted through the DL-SCH or through a separate multicast channel (MCH). Meanwhile, uplink transport channels for transporting data from the UE to the network include a random access channel (RACH) which transmits the initial control message and an uplink shared channel which transmits user traffic or a control message.

A logical channel lies in the upper hierarchy of a transport channel and is mapped to the transport channel. A logical channel is divided into a control channel for transmission of control area information and a traffic channel for transmission of user area information. Logical channels include a broadcast control channel (BCCH), a paging control channel (PCCH), a common control channel (CCCH), a dedicated control channel (DCCH), a multicast control channel (MCCH), a dedicated traffic channel (DTCH), and a multicast traffic channel (MTCH). The PCCH is a downlink channel transferring paging information and is used when the network does not know a cell to which the UE belongs. The CCCH is used by a UE having no RRC connection with the network. The MCCH is a point-to-multipoint downlink channel which is used to transfer multimedia broadcast and multicast service (MBMS) control information from the network to the UE. The DCCH is a point-to-point bi-directional channel that is used by a UE having RRC connection transferring dedicated control information between the UE and the network. The DTCH is a point-to-point channel which is dedicated to one UE for transferring user information that can exist in uplink and downlink. The MTCH is a point-to-multipoint downlink channel for transmitting traffic data from the network to the UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

Figure 4:
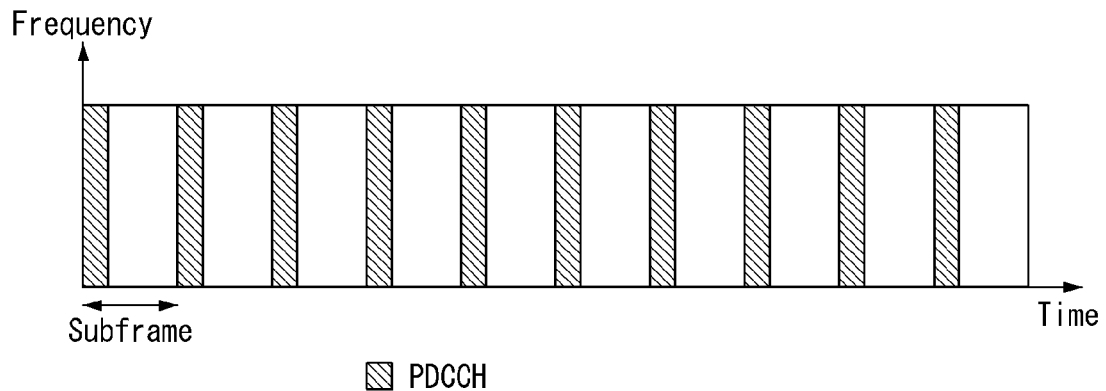
FIG. 4 schematically illustrates a structure of a physical channel in a wireless communication system to which the present invention is applicable.

FIG. 4 schematically illustrates a structure of a physical channel in a wireless communication system to which the present invention is applicable.

Referring to FIG. 4, the physical channel transfers signaling and data on radio resources consisting of one or more subcarriers in a frequency domain and one or more symbols in a time domain.

One subframe with 1.0 ms length consists of a plurality of symbols. Specific symbol(s) of the subframe (e.g., a first symbol of the subframe) may be used for PDCCH. The PDCCH carries information about dynamically allocated resources (e.g., resource block, modulation and coding scheme (MCS), etc.).

Random Access Procedure

A random access procedure provided by the LTE/LTE-A system is described below.

The random access procedure is performed when a UE performs initial access in an RRC idle state because it does not have RRC connection with an eNB, when the UE performs an RRC connection re-establishment procedure, and the like.

The LTE/LTE-A system provides both a contention based random access procedure in which the UE randomly selects to use one preamble in a specific set, and a non-contention based random access procedure in which the eNB uses a random access preamble that the eNB allocates to only a specific UE, in a process of selecting a random access preamble (RACH preamble).

Figure 5:
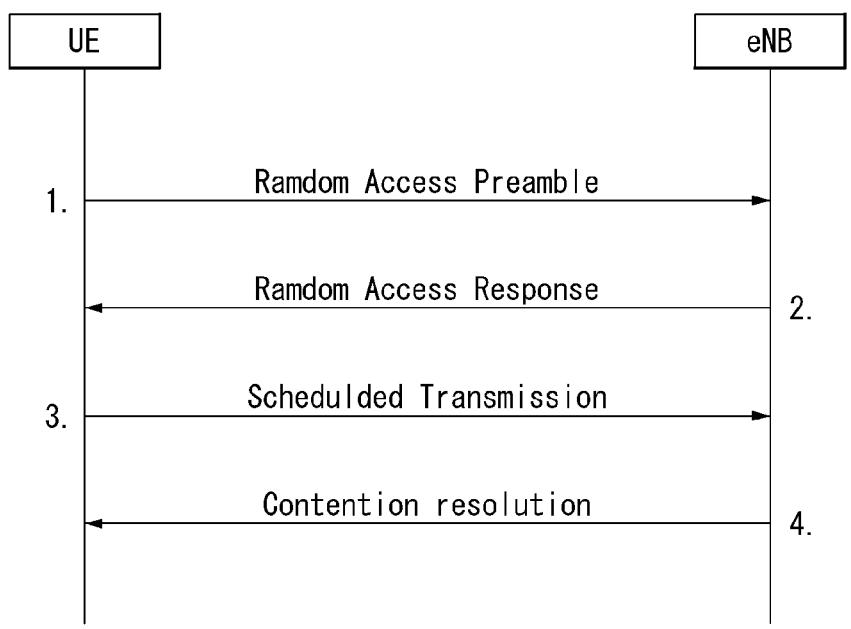
FIG. 5 illustrates a contention based random access procedure in a wireless communication system to which the present invention is applicable.

FIG. 5 illustrates a contention based random access procedure in a wireless communication system to which the present invention is applicable.

(1) First Message (Msg 1, Message 1)

First, a UE randomly selects one random access preamble (RACH preamble) from a set of random access preambles indicated through system information or a handover command, selects a physical RACH (PRACH) resource capable of transmitting the random access preamble, and transmits the selected PRACH.

An eNB receiving the random access preamble from the UE decodes the random access preamble and obtains an RA-RNTI. The RA-RNTI related to the PRACH, to which the random access preamble is transmitted, is determined by time-frequency resources of the random access preamble transmitted by the corresponding UE.

(2) Second Message (Msg 2, Message 2)

The eNB transmits, to the UE, a random access response addressed to the RA-RNTI obtained via the preamble on the first message. The random access response may include a random access (RA) preamble index/identifier, an uplink (UL) grant informing of uplink radio resources, a temporary cell-RNTI (TC-RNTI), and time alignment commands (TACs). The TAC is information indicating a time alignment command that the eNB sends to the UE in order to maintain an uplink time alignment. The UE updates an uplink transmission timing using the TAC. When the UE updates a time alignment, the UE initiates or restarts a time alignment timer. The UL grant includes an uplink resource allocation and a transmit power command (TPC) that are used to send a scheduling message (third message) to be described later. The TPC is used to determine transmission power for a scheduled PUSCH.

After the UE transmits the random access preamble, the UE attempts to receive its own random access response within a random access response window that the eNB indicates through system information or a handover command, detects a PDCCH masked with an RA-RNTI corresponding to PRACH, and receives a PDSCH indicated by the detected PDCCH. Information about the random access response may be transmitted in the form of a MAC packet data unit (PDU), and the MAC PDU may be transferred via the PDSCH.

If the UE successfully receives a random access response having the same random access preamble index/identifier as the random access preamble that has been transmitted to the eNB, the UE stops the monitoring of the random access response. On the other hand, if the UE does not receive a random access response message until the random access response window is terminated, or the UE does not receive a valid random access response having the same random access preamble index as the random access preamble that has been transmitted to the eNB, the UE considers the reception of the random access response as a failure and then may perform preamble retransmission.

(3) Third Message (Msg 3, Message 3)

If the UE receives a random access response valid for itself, the UE processes each of information included in the random access response. That is, the UE applies a TAC and stores a TC-RNTI. Further, the UE transmits data stored in a buffer of the UE or newly generated data to the eNB using the UL grant.

In case of a first connection of the UE, an RRC connection request that is generated in the RRC layer and is transferred via a CCCH may be included in a third message and transmitted. In case of an RRC connection re-establishment procedure, an RRC connection re-establishment request that is generated in the RRC layer and is transferred via a CCCH may be included in the third message and transmitted. Further, the third message may include an NAS access request message.

The third message should include an identifier of the UE. There are two methods for including the identifier of the UE in the third message. In a first method, if the UE already had a valid cell identifier (C-RNTI) allocated in a corresponding cell prior to the random access procedure, the UE transmits its own cell identifier through an uplink transmission signal corresponding to the UL grant. On the other hand, if a valid cell identifier was not allocated to the UE prior to a random access procedure, the UE transmits including its own unique identifier (e.g., S-TMSI (SAE temporary mobile subscriber identity) or random number). In general, the unique identifier is longer than a C-RNTI.

If the UE transmitted data corresponding to the UL grant, it initiates a contention resolution timer.

(4) Fourth Message (Msg 4, Message 4)

If the eNB receives a C-RNTI of the corresponding UE from the UE through the third message, the eNB sends a fourth message to the UE using the received C-RNTI. On the other hand, if the eNB receives a unique identifier (i.e., S-TMSI or random number) from the UE through the third message, the eNB sends the fourth message to the UE using a TC-RNTI allocated to the corresponding UE in a random access response. For example, the fourth message may include an RRC connection setup message.

The UE transmits data including its own identifier through the UL grant included in the random access response, and then waits for an instruction of the eNB for a contention resolution. That is, the UE attempts to receive a PDCCH in order to receive a specific message. There are two methods for receiving the PDCCH. As described above, if the identifier of the UL in the third message transmitted in response to the UL grant is C-RNTI, the UE attempts to receive the PDCCH using its own C-RNTI, and if the identifier of the UL is a unique identifier (i.e., S-TMSI or random number), the UE attempts to receive the PDCCH using a TC-RNTI included in the random access response. Afterwards, in the former case, if the UE received the PDCCH through its own C-RNTI before the contention resolution timer expires, the UE determines that the random access procedure has been normally performed, and terminates the random access procedure. In the latter case, if the UE received the PDCCH through the TC-RNTI before the contention resolution timer expires, the UE checks data to which a PDSCH indicated by the PDCCH is transferred. If the unique identifier of the UE was included in contents of the data, the UE determines that the random access procedure has been normally performed, and terminates the random access procedure. The UE obtains the C-RNTI through the fourth message. Afterwards, the UE and a network transmit and receive a UE-dedicated message using the C-RNTI.

Unlike the contention based random access procedure illustrated in FIG. 5, the operation in the non-contention based random access procedure is terminated by only the transmission of the first message and the second message. That is, the UE is allocated a random access preamble from the eNB before transmitting to the eNB the random access preamble as the first message, transmits to the eNB the allocated random access preamble as the first message, and receives a random access response from the eNB, thereby terminating the random connection procedure.

RRC Connection Re-Establishment Procedure

An RRC connection re-establishment procedure is described in more detail below.

Figure 6:
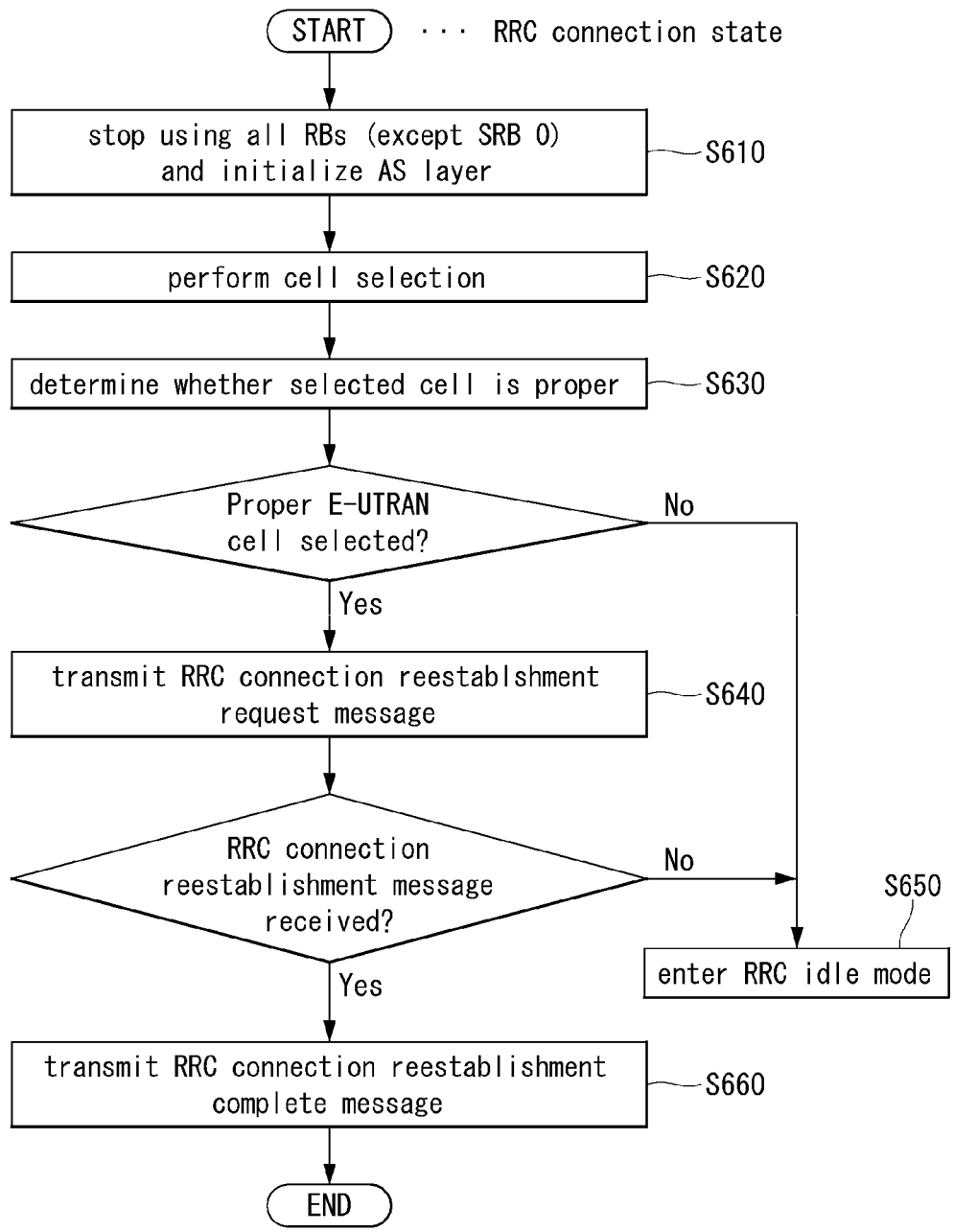
FIG. 6 illustrates an example of a procedure of transmitting and receiving sidelink UE information.

FIG. 6 illustrates an example of an RRC connection re-establishment procedure to which the present invention is applicable.

Referring to FIG. 6, the UE stops using all radio bearers, that have been configured, except SRB 0 (signaling radio bearer #0), and initializes various sub-layers of access stratum (AS) in S610.

The UE configures each sub-layer and a physical layer as a default configuration. During such a process, the UE maintains an RRC connection state.

The UE performs a cell selection procedure for performing an RRC connection re-establishment procedure in S620. The cell selection procedure of the RRC connection re-establishment procedure may be performed in the same manner as a cell selection procedure that the UE performs in the idle state although the UE maintains the RRC connection state.

After the UE performs the cell selection procedure, the UE checks system information of a corresponding cell and determines whether the corresponding cell is an appropriate cell or not in S630. If the selected cell is determined as an appropriate E-UTRAN cell, the UE sends an RRC connection re-establishment request message to the corresponding cell in S640.

If the selected cell through the cell selection procedure for performing the RRC connection re-establishment procedure is determined as a cell using other RAT other than E-UTRAN, the UE stops the RRC connection re-establishment procedure and enters an RRC idle state in S650.

The UE may be configured so that the appropriateness check of the cell through the cell selection procedure and system information reception of the selected cell is completed within a limited time. To this end, the UE may run a timer as the UE initiates the RRC connection re-establishment procedure. The timer may be stopped if it is determined that the UE selected the appropriate cell. If the timer expires, the UE considers the RRC connection re-establishment procedure as a failure and may enter the RRC idle state. Hereinafter, the timer is referred to as a radio link failure timer. In LTE Spec TS 36.331, a timer called T311 may be utilized as a radio link failure timer. The UE may obtain a configuration value of the timer from system information of a serving cell.

If the cell receives the RRC connection re-establishment request message from the UE and accepts the request, the cell sends an RRC connection re-establishment message to the UE.

The UE receiving the RRC connection re-establishment message from the cell reconfigures a PDCP sub-layer and a RLC sub-layer for SRB1. Further, the UE calculates again various key values related to security configuration and reconfigures the PDCP sub-layer responsible for security as the newly calculated security key values.

Hence, the SRB1 between the UE and the cell is open, and the UE and the cell can exchange RRC control messages. The UE completes the resume of the SRB1 and sends, to the cell, an RRC connection re-establishment complete message that the RRC connection re-establishment procedure has been completed in S660.

On the other hand, if the cell receives the RRC connection re-establishment request message from the UE and does not accepts the request, the cell sends an RRC connection re-establishment reject message to the UE.

If the RRC connection re-establishment procedure is successfully performed, the cell and the UE perform the RRC connection re-establishment procedure. Hence, the UE recovers the state prior to the execution of the RRC connection re-establishment procedure, and maximally guarantees continuity of service.

Sidelink Communication Monitoring

FIG. 7 illustrates an example of a procedure of transmitting and receiving sidelink UE information (sidelinkUEInformation).

The purpose of this procedure is to inform the E-UTRAN that the UE is more interested or no longer interested to receive sidelink communication or discovery, not only request allocation or release of transmission resources for sidelink communication or discovery announcement or V2X sidelink communication or sidelink discovery gap but also receive the V2X sidelink communication, and report parameters related to sidelink discovery from system information of inter-frequency/PLMN cell.

Next, sidelink communication monitoring is described.

A UE capable of sidelink communication that is configured by upper layers to receive sidelink communication:

1> if the conditions for sidelink communication operation are met:

2> if in coverage on the frequency used for sidelink communication:

3> if a cell chosen for sidelink communication reception broadcasts SystemInformationBlockType18 including commRxPool:

4> configures lower layers to monitor sidelink control information and corresponding data using the pool of resources indicated by commRxPool.

If commRxPool includes one or more entries including rxParametersNCell, the UE may monitor only such entries if associated primary synchronization signal (PSS)/secondary synchronization signal (SSS) or sidelink synchronization signal (SLSS) ID is detected. When monitoring such pool, the UE applies timing of the concerned PSS/SSS or SLSS.

2> Else, if out of coverage of the sidelink carrier (i.e., frequency used for sidelink communication):

3> the UE configures lower layers to monitor sidelink control information and the corresponding data using the pool of resources that were preconfigured.

The UE may monitor if the UE does not have a selected SyncRef UE in accordance with the timing of the selected SyncRef UE or based on the UE's own timing.

Sidelink Communication Transmission

A UE capable of sidelink communication that is configured by upper layers to transmit non-relay related sidelink communication and has related data to be transmitted, or a UE capable of relay related sidelink communication that is configured by upper layers to transmit relay related sidelink communication and satisfies the conditions for relay related sidelink communication:

1> if the conditions for sidelink communication operation are met:

2> if in coverage on the frequency used for sidelink communication:

3> if the UE is in an RRC CONNECTED state and uses the PCell for sidelink communication:

4> if the UE is configured, by the current PCell/the PCell in which a physical layer problem or a radio link failure was detected, with scheduled commTxResources:

5> if T310 or T311 is running; and if the PCell at which the UE detected the physical layer problem or the radio link failure broadcasts SystemInformationBlockType18 including commTxPoolExceptional; or 5> if T301 is running and the cell on which the UE initiated connection re-establishment broadcasts SystemInformationBlockType18 including commTxPoolExceptional:

6> configures lower layers to transmit sidelink control information and corresponding data using the pool of resources indicated by a first entry in commTxPoolExceptional;

5> else:

6> configures lower layers to request E-UTRAN to assign transmission resources for sidelink communication;

4> else if the UE is configured with commTxPoolNormalDedicated or commTxPoolNormalDedicatedExt:

5> if priorityList is included for the entries of commTxPoolNormalDedicated or commTxPoolNormalDedicatedExt:

6> configures lower layers to transmit the sidelink control information and the corresponding data using the one or more pools of resources indicated by commTxPoolNormalDedicated or commTxPoolNormalDedicatedExt i.e. indicates all entries of this field to lower layers;

5> else:

6> configures lower layers to transmit the sidelink control information and the corresponding data using the pool of resources indicated by the first entry in commTxPoolNormalDedicated;

3> else (i.e. sidelink communication in RRC IDLE or on cell other than PCell in RRC CONNECTED):

4> if the cell chosen for sidelink communication transmission broadcasts SystemInformationBlockType18:

5> if SystemInformationBlockType18 includes commTxPoolNormalCommon:

6> if priorityList is included for the entries of commTxPoolNormalCommon or commTxPoolNormalCommonExt:

7> configures lower layers to transmit the sidelink control information and the corresponding data using the one or more pools of resources indicated by commTxPoolNormalCommon and/or commTxPoolNormalCommonExt, i.e., indicates all entries of these fields to lower layers;

6> else:

7> configures lower layers to transmit the sidelink control information and the corresponding data using the pool of resources indicated by the first entry in commTxPoolNormalCommon;

5> else if SystemInformationBlockType18 includes commTxPoolExceptional:

6> from the moment the UE initiates connection establishment until receiving an RRCConnectionReconfiguration including sl-CommConfig or until receiving an RRCConnectionRelease or an RRCConnectionReject;

7> configures lower layers to transmit the sidelink control information and the corresponding data using the pool of resources indicated by the first entry in commTxPoolExceptional;

2> else (i.e. out of coverage on sidelink carrier):

3> if priorityList is included for the entries of preconfigComm in SL-Preconfiguration:

4> configures lower layers to transmit the sidelink control information and the corresponding data using the one or more pools of resources indicated by preconfigComm, i.e., indicates all entries of this field to lower layers and in accordance with the timing of the selected SyncRef UE, or if the UE does not have a selected SyncRef UE, based on the UEs own timing;

3> else:

4> configures lower layers to transmit the sidelink control information and the corresponding data using the pool of resources that were preconfigured.

The conditions for relay related sidelink communication are as follows.

1> if the transmission concerns sidelink relay communication; and the UE is capable of sidelink relay or sidelink remote operation:

2> if the UE is in RRC IDLE; and if the UE has a selected sidelink relay UE: the UE configures lower layers to transmit the sidelink control information and the corresponding data using the specific resources, only if the following condition is met:

3> if the sidelink remote UE threshold conditions are met; and if the UE configured lower layers with a pool of resources included in SystemInformationBlockType18 (e.g., commTxPoolNormalCommon, commTxPoolNormalCommonExt or commTxPoolExceptional); commTxAllowRelayCommon is included in SystemInformationBlockType18;

2> if the UE is in RRC CONNECTED: the UE configures lower layers to transmit the sidelink control information and the corresponding data using the specific resources, only if the following condition is met:

3> if the UE configured lower layers with resources provided by dedicated signalling (i.e., commTxResources); the UE is configured with commTxAllowRelayDedicated set to 'true'.

The technology for a relay operation may be performed via various links (i.e. UE-to-UMTS (Uu) and PC5 (ProSe communication 5, proximity communication 5)).

That is, the relay operation may be applied to various networks (i.e., narrow band-Internet of things (NB-IoT) or new radio access (NR)).

Figure 8:
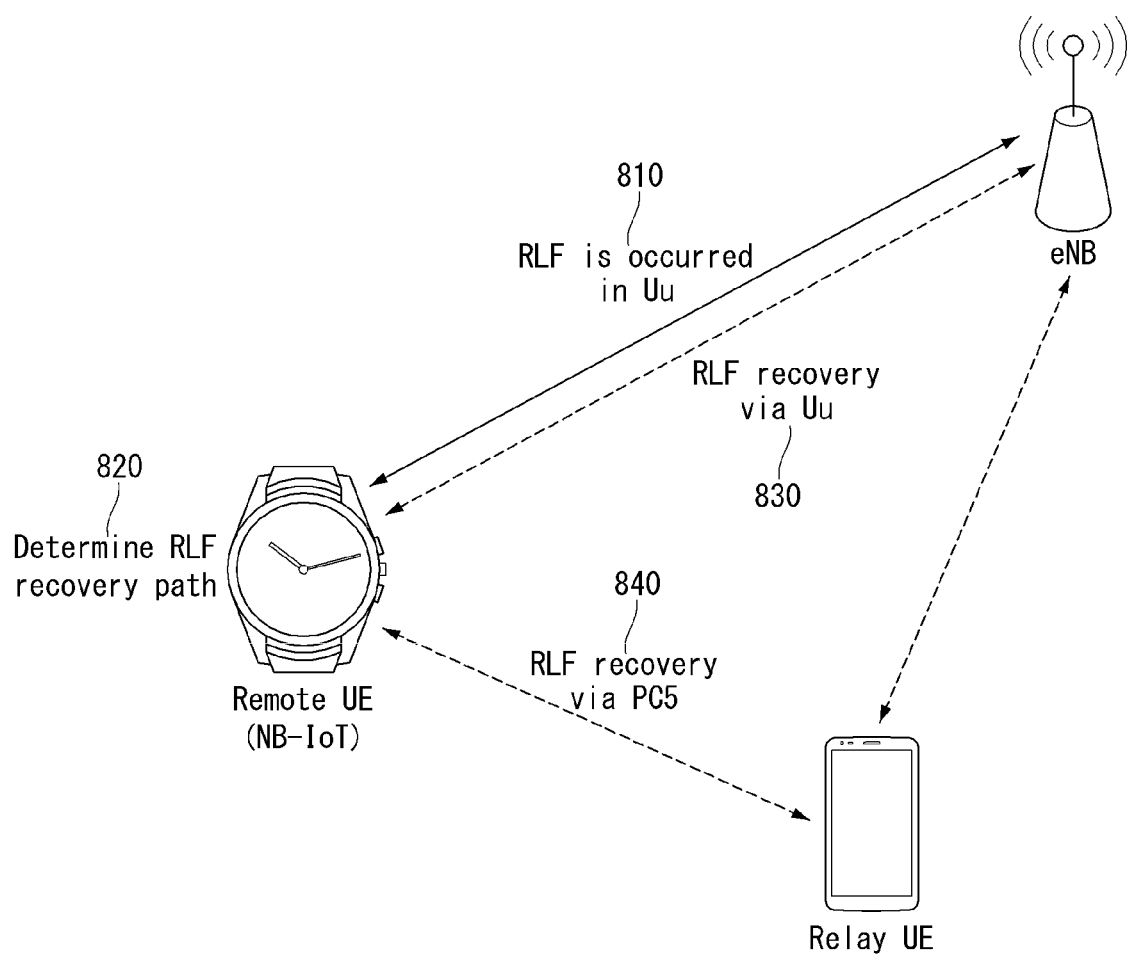
FIG. 8 illustrates an example of a path reselection procedure when a RLF occurs in a NB-IoT network proposed by the present specification.

As illustrated in FIG. 8 to be described below, in NB-IoT network, a remote UE may be connected with a relay UE and may be connected with a network (or eNB).

Based on L2 relay, the eNB has to store both UE contexts (e.g., RRC) of the relay UE and the remote UE.

Hence, the remote UE may establish either direct connection (i.e., Uu interface with the eNB) or indirect connection (i.e., PC5 interface with the relay UE) and transmit data.

Since the remote UE can support both connections (Uu and PC5) and a path (or route) (re)selection between the connections is also supported, an appropriate path reselection is necessary if an abrupt radio link failure (RLF) is detected.

In case of each remote UE, there may be a trouble using the Uu link, especially, to enhance a coverage area due to a limited RF chain capacity.

In the NR network, the path reselection problem mentioned above may occur as well.

Since NR network nodes (e.g., integrated access and backhaul (IAB) node) are connected with forming multiple hops, a suitable path should be selected. Detailed content related to this is described below.

Such a path (re)selection scheme is necessary to support service continuity, and the RLF occurs among the NR nodes.

However, since a legacy path reselection procedure is considered only by path reselection conditions based on a reference signal received power (RSRP), it does not deal with various unexpected RLF occurrences.

Moreover, in the legacy path reselection procedure, various data characteristics (e.g., 5QI (5G QoS Indicator), QCI (QoS Class Identifier) level, delay tolerant, beam state, etc.) of the remote UE and NR nodes are not considered to perform the path reselection.

Hereinafter, a method for reselecting, by a device or a node, a path upon occurrence of the RLF proposed in the present specification is divided and described into (1) NB-IoT network and (2) NR network.

First Embodiment

A first embodiment relates to a path reselection scheme in the NB-IoT network.

In advance to describe the first embodiment, it is assumed that a remote UE has an RRC connection with an eNB.

In the first embodiment, the remote UE and a relay UE may be expressed as an NB-IoT UE or an NB-IoT device, etc., and may be respectively referred to as a first NB-IoT device and a second NB-IoT device.

Hereinafter, the remote UE and the relay UE are used for convenience of explanation.

Uu link conditions (link conditions between the remote UE and the eNB) may be seriously degraded due to a limited RF capacity of the remote UE in an enhanced coverage area.

Consequently, an abrupt radio link failure (RLF) may occur on a Uu link.

That is, the first embodiment represents a path reselection scheme by the remote UE when the abrupt RLF occurs on the Uu link between the remote UE and the eNB.

In specific, if the remote UE detects an RLF on the Uu link (or Uu interface), the remote UE initiates a (connection) re-establishment procedure in order to recover the RLF.

The remote UE considers whether the reestablishment procedure is performed by a sidelink or not.

It may determine a recovery procedure based on various characteristics of remote UE's data.

If a priority of data of the remote UE is low (e.g., delay tolerant), the recovery procedure is performed via the sidelink in order to reduce energy consumption.

Otherwise, if a priority of data is high, the recovery procedure is performed via an established Uu link.

In addition, the remote UE does not maintain a PC5 connection for reducing energy consumption, instead it can initiate to establish the PC5 connection only when it is necessary (i.e. upon the re-establishment procedure).

The first embodiment, i.e., the path reselection scheme in the NB-IoT network may be performed by the following two methods (Method 1 and Method 2).

Method 1: Path Reselection by Various Factors

Method 1 describes that a path reselection scheme by a remote UE is performed by various factors such as QCI, delay, energy, etc.

The path reselection scheme by the Method 1 is performed by the following steps, and each step is described in detail below.

First, the remote UE establishes an RRC connection with an eNB and receives from the eNB transmission and/or reception resource configuration via dedicated signaling with the eNB (Step 1).

In the present specification, 'A and/or B' can be interpreted in the same sense as 'including at least one of A or B'.

Next, the criteria of path reselection thresholds for various factors (either Uu or PC5) are configured from the eNB (Step 2).

Next, the remote UE initiates downlink/uplink transmission via Uu connection (Step 3).

Next, an RLF occurs on a Uu link, and the RLF is detected by the remote UE (Step 4).

Next, it is assumed that the remote UE initiates to establish PC5 connection after data is determined to be transmitted over PC5 (Step 5).

Next, after the remote UE detects the RLF, the remote UE performs a path reselection that initiates a re-establishment procedure in order to recover the RLF (Step 6).

Next, the remote UE considers the followings in order to reselect a path (Step 7).

That is, the remote UE determines whether to perform an RLF recovery process via the sidelink or the Uu link according to the following conditions.

Specifically, the remote UE selects the sidelink in order to perform the RLF recovery process in the following cases (Step 7-1).

If a lowest QCI level of established bearers is higher than a threshold QCI,

If a delay budget (e.g. packet delay budget (PDB)) is higher than a threshold delay, If a highest bearer priority or a logical channel priority of the established bearers is lower than a threshold priority, If a highest ProSe-per-packet priority (PPPP) of the established bearers is higher than a PPPP threshold, If a remaining battery of the remote UE is lower than a threshold, The remote UE selects the Uu link in order to perform the RLF recovery process in the following cases (Step 7-2).

If a lowest QCI level of the established bearers is lower than or equal to the threshold QCI, If a delay budget (e.g. packet delay budget (PDB)) is lower than or equal to the threshold delay, If a highest bearer priority or a logical channel priority of the established bearers is higher than or equal to the threshold priority, If a highest PPPP of the established bearers is lower than or equal to the PPPP threshold, If a remaining battery of the remote UE is higher than or equal to the threshold, If the remote UE satisfies the conditions mentioned in the step 7-2 and selects the Uu link, the existing RRC connection re-establishment procedure is performed.

Alternatively, if the remote UE satisfies the conditions mentioned in the step 7-1 and selects the sidelink, the remote UE sends a re-establishment request message to a network via a relay UE.

Then, the network sends a response message to the remote UE via the relay UE.

If the RLF is recovered in the step 7-1, the following step 8 is performed. If the RLF is recovered in the step 7-2, the following step 10 is performed.

In the above, the threshold may be provided via broadcast signaling or dedicated signaling or preconfigured.

The step 8 is as follows.

If the relay UE is not detected in proximity, the remote UE cannot perform a path reselection. Hence, the remote UE selects the Uu link.

Alternatively, if there is no linked relay UE supporting the service which the remote UE has used, the remote UE selects the Uu link. Then, the step 10 is performed.

If the relay UE is detected in proximity, the remote UE can determine to perform a path reselection via the sidelink.

Hence, the remote UE establishes PC5 connection with the detected relay UE. Then, step 9 is performed.

Next, the remote UE can transmit/receive data that can be relayed by the relay UE (e.g., in case of PC5) (Step 9).

Next, the remote UE performs a re-establishment procedure with the network (Step 10).

Then, the remote UE can transmit/receive data to/from the eNB.

Method 2: Path reselection by reference signal received power (RSRP)

Method 2 relates to a path reselection scheme performed by RSRP, and specifically, is performed by the following steps.

First, a remote UE establishes an RRC connection with an eNB and receives from the eNB transmission and/or reception resource configuration via dedicated signaling with the eNB (Step 1).

Next, the criteria of path reselection thresholds (either Uu or PC5) are configured from the eNB (Step 2).

Next, the remote UE initiates downlink/uplink transmission with the eNB via Uu connection (Step 3).

Next, an RLF occurs on a Uu link, and the RLF is detected by the remote UE (Step 4).

Next, if data is determined to be transmitted over PC5, it is assumed that the remote UE initiates to establish PC5 connection (Step 5).

Next, after the remote UE detects the RLF, the remote UE performs a path reselection that initiates a re-establishment procedure in order to recover the RLF (Step 6).

Next, in advance to perform the path reselection by the remote UE, the remote UE compares received RSRP with sidelink (SD)-RSRP (Step 7).

The Step 7 may be further specified by the following steps 7-1 to 7-4.

That is, if measured SD-RSRP is higher than a RSRP threshold, the remote UE selects a sidelink path. Otherwise, the remote UE selects the Uu link (Step 7-1).

If measured RSRP of a selected cell is higher than the RSRP threshold, the remote UE selects the Uu link. Otherwise, the remote UE selects the sidelink (Step 7-2).

If measured RSRP of the selected cell is lower than a threshold, and sidelink quality (e.g. SD-RSRP) between the remote UE and a relay UE is higher than another threshold, the UE selects the sidelink. Otherwise, the remote UE selects the Uu link (Step 7-3).

If measured RSRP of the selected cell is lower than measured sidelink quality between the remote UE and the relay UE, the UE selects the sidelink. Otherwise, the remote UE selects the Uu link (Step 7-4).

If the remote UE selects the Uu link, the existing RRC connection re-establishment procedure is performed.

If the remote UE selects the sidelink, the remote UE sends a re-establishment request message to a network via the relay UE.

Then, the network sends a response message to the remote UE via the relay UE.

Next, step 8 is described.

If the relay UE is not detected in proximity, the remote UE cannot perform a path reselection. Hence, the remote UE selects the Uu link.

Alternatively, if there is no linked relay UE supporting the service which the remote UE has used, the remote UE selects the Uu link. Then, the following step 10 is performed.

Alternatively, if the relay UE is detected in proximity, the remote UE can determine to perform a path reselection via the sidelink. Hence, the remote UE establishes PC5 connection with the detected relay UE. Then, the following step 9 is performed.

Next, the step 9 is described.

The remote UE transmits/receives data that can be relayed by the relay UE (e.g., in case of PC5) (Step 9).

Next, the step 10 is described.

Next, the remote UE performs a re-establishment procedure with the network. Then, the remote UE transmits/receives data to/from the eNB.

FIG. 8 illustrates an example of a path reselection procedure when a RLF occurs in a NB-IoT network proposed by the present specification.

First, if a RLF occurs on a Uu link between an eNB and a remote UE (S810), the remote UE determines a path (or route) for recovering the RLF (S820).

In the same manner, the remote UE and a relay UE may be expressed as an NB-IoT UE or an NB-IoT device, etc.

First, in the step S820, if the remote UE determines a Uu link as an RLF recovery path, the remote UE performs an RRC connection re-establishment procedure with the eNB (S830).

Alternatively, in the step S820, if the remote UE determines a sidelink (or PC5) as the RLF recovery path, the remote UE performs a re-establishment procedure with the eNB (or network) via a relay UE (S840).

Specifically, the remote UE sends a re-establishment request message to the eNB (or network) via the relay UE.

Then, the eNB sends a response message to the remote UE via the relay UE and thus performs an RLF recovery procedure.

Figure 9:
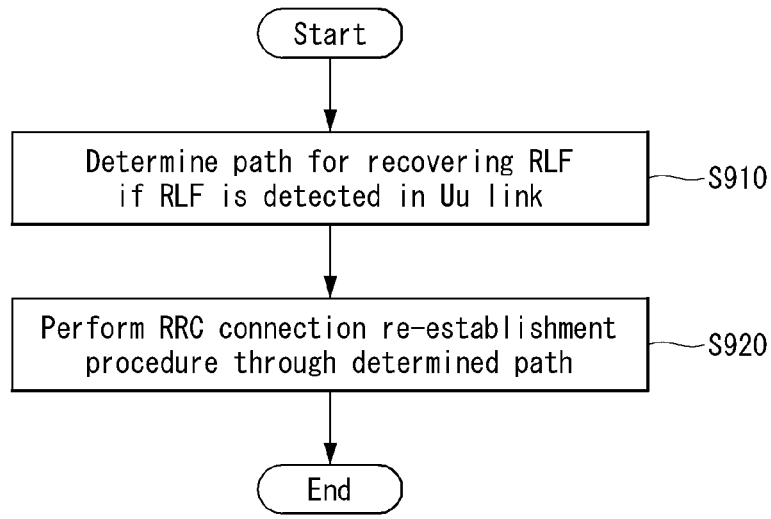
FIG. 9 is a flow chart illustrating an example of a path reselection scheme by a UE proposed by the present specification.

FIG. 9 is a flow chart illustrating an example of a path reselection scheme by a UE proposed by the present specification.

More specifically, FIG. 9 illustrates a method for performing, by a first user equipment (UE), a RLF recovery procedure in a wireless communication system.

It is assumed that the first UE is connected to a base station via a UE-to-UMTS (Uu) link and is connected to a second UE via a sidelink.

For example, the first UE may be a remote UE, and the second UE may be a relay UE.

First, if a RLF is detected on the Uu link, the first UE determines a path for performing the RLF recovery procedure (S910).

The path for performing the RLF recovery procedure may be determined based on a factor related to data characteristic of the first UE.

For example, the factor related to the data characteristic of the first UE may be a Qos class identifier (QCI), a packet delay budget, a priority, and the like.

Next, the first UE performs an RRC connection re-establishment procedure in order to recover the RLF through the determined path (S920).

The determined path may be the Uu link or the sidelink.

Referring more specifically to the determination of the path, the first UE receives, from the base station, a threshold for the factor related to the data characteristic of the first UE.

The first UE compares the factor related to the data characteristic of the first UE with the received threshold and thus can determine the path for performing the RLF recovery procedure.

If the determined path is the sidelink, the first UE sends, to the second UE, a request message for requesting a RRC connection re-establishment and receives, from the second UE, a response message to the request message, in order to perform the RRC connection re-establishment procedure.

Integrated Access Backhaul (IAB)

IAB corresponds to technology that can be used for 5G or NR in that it enables flexible and very dense deployment of new radio access (NR) cells without the need for densifying a transport network.

In regard to the IAB in NR, a topology management for single hop and multi-hop connections has been discussed.

Multi-hop backhauling provides wider coverage extension than single hop.

Further, the multi-hop backhauling can enable backhauling around obstacles.

The number of hops may be variously configured depending on various factors (e.g., deployment scenario, traffic load, frequency, etc.).

In such a topology structure, multiple relay nodes (e.g., anchor nodes, relay nodes) are connected between an NR core network and a UE.

Hierarchically, the NR core network may be connected to an anchor node (e.g., donor node), and many relay nodes may be connected to the anchor node.

Figure 10:
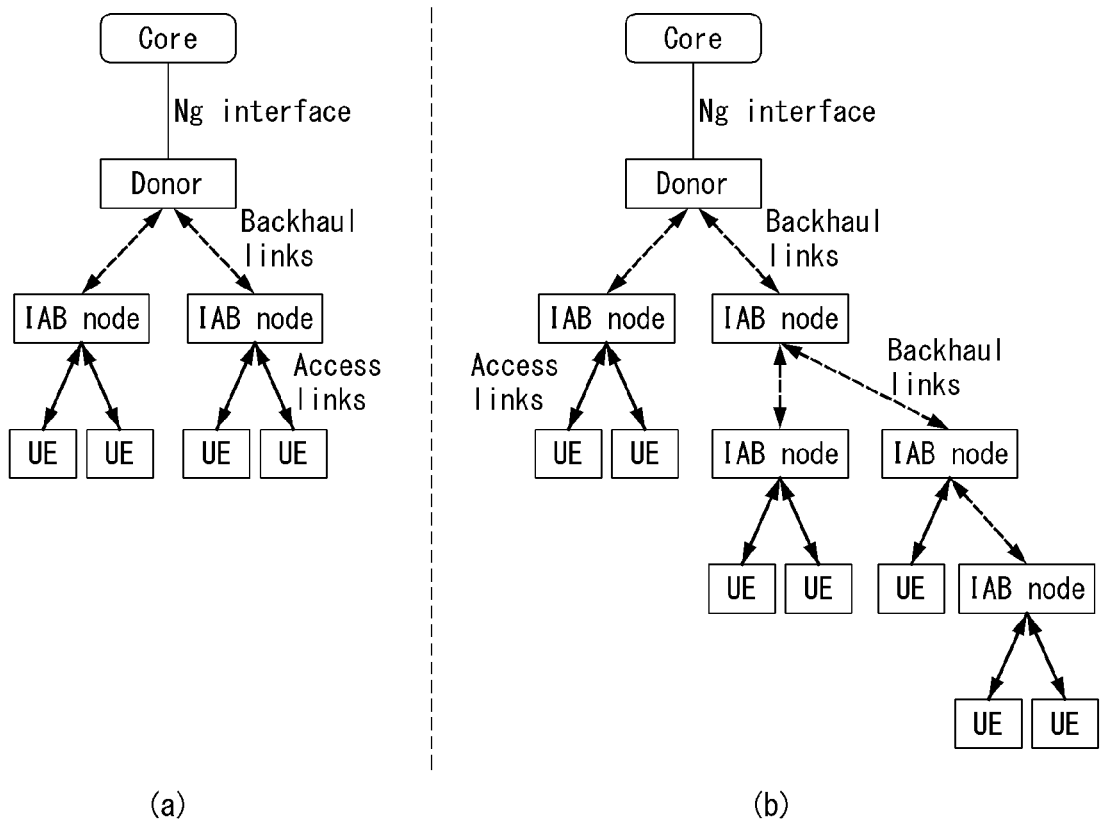
FIG. 10 illustrates an example of an IAB topology structure.

FIG. 10 illustrates an example of an IAB topology structure.

More specifically, FIG. 10a illustrates a single-hop backhaul structure, and FIG. 10b illustrates a multi-hop backhaul structure.

In FIG. 10, a donor node corresponding to an anchor node may be connected to an NG core, one or more IAB nodes (or relay nodes) may be connected to the donor node, and one or more devices may be connected to the IAB nodes.

Figure 11:
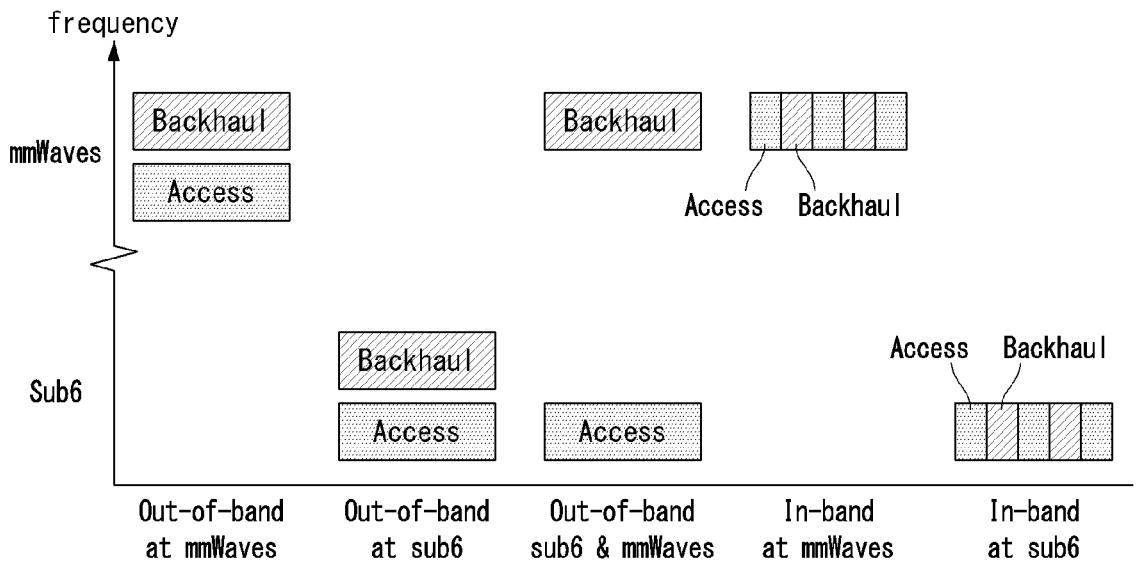
FIG. 11 illustrates an example of in-band and out-band IABs.

FIG. 11 illustrates an example of in-band and out-band IABs.

In-band IAB represents that an access link and a backhaul link at least partially overlap on frequency, and out-band IAB represents that an access link and a backhaul link can operate independently.

In-band IAB scenarios including the access and backhaul links (TDM/FDM/SDM) subject to half-duplex constraint at an IAB node can be supported.

Out-band IAB scenarios can also be supported using the same set of RAN functions designed for in-band scenarios.

In the NR, it may be critical to study in-band operation which requires interworking with the access link to accommodate the half-duplex constraints (e.g., when the IAB node cannot transmit and receive simultaneously on the carrier) and avoid (or mitigate) interference.

Further, IAB can operate in both mmWave and sub-6 GHz (or below 6 GHz).

Second Embodiment

A second embodiment relates to a path reselection scheme in a NR network.

Based on the above description, a method for performing a path re-establishment procedure of a remote UE proposed by the present specification in the NR network is described below.

Here, 'path re-establishment' or 'path reselection' used in the present specification can be interpreted in the same sense.

In the NR network, the path reselection problem mentioned above may occur as well.

Figure 12:
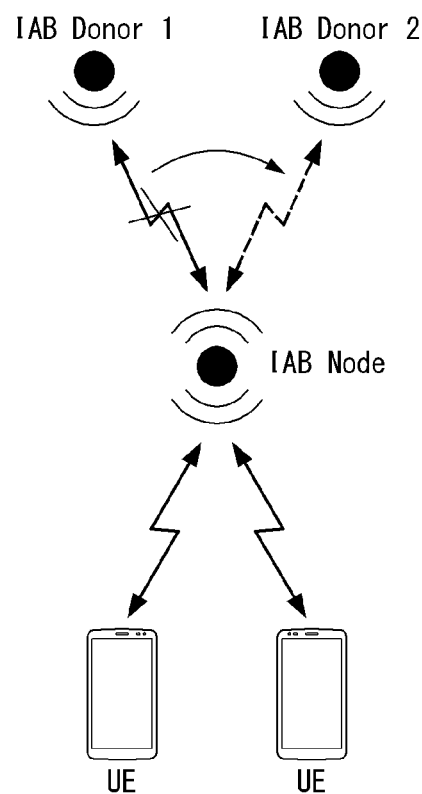
FIG. 12 illustrates an example of a situation where a path reselection is necessary in an NR network.

FIG. 12 illustrates an example of a situation where a path reselection is necessary in an NR network.

With reference to FIG. 12, it illustrates a situation where a path between IAB donor 1 and IAB node cannot be used as a RLF, etc. In this case, data can be exchanged between IAB donor 2 and the IAB node through a path reselection.

Since NR network nodes (e.g., IAB relay nodes) are connected with forming multiple hops, a suitable path should be selected.

Such a path reselection scheme is necessary to support service continuity while the RLF occurs.

Therefore, it is necessary how to determine and reselect the suitable path based on various factors.

The present specification considers a 5G QoS indicator (5QI) which is applied to a QoS parameter since it reflects and map detailed characteristic of a specific data flow.

In addition, a specific congestion level of the hop is different since each node works as a UE and backhaul, respectively.

The path reselection may be performed by a distributed manner or a centralized manner.

When the distributed manner is applied, assistance information will be necessary among relay nodes.

The assistance information may be transmitted, for example, periodically or based on event triggered.

A method for performing, by a specific node (e.g., relay node), a path selection in the NR network is described in detail below.

Here, the specific node may be expressed as a gNB, a base station, a network, a device, etc.

Hereinafter, the specific node is expressed as a relay node for convenience of explanation.

The second embodiment is performed by various factors such as 5QI, slice/service type (enhanced mobile broadband (eMBB), ultra reliable low latency communication (URLLC), MIoT), a congestion (load) level, a beam state, etc.

In this case, the beam state may correspond to whether beam directions match between relay nodes, beam on or off of the relay node, beam management of the relay node, or the like.

In addition, the beam direction coincidence may use a quasi co-location (QCL) with a channel state information-reference signal (CSI-RS), a sounding reference signal (SRS), a synchronization signal block (SSB), and the like.

Figure 13:
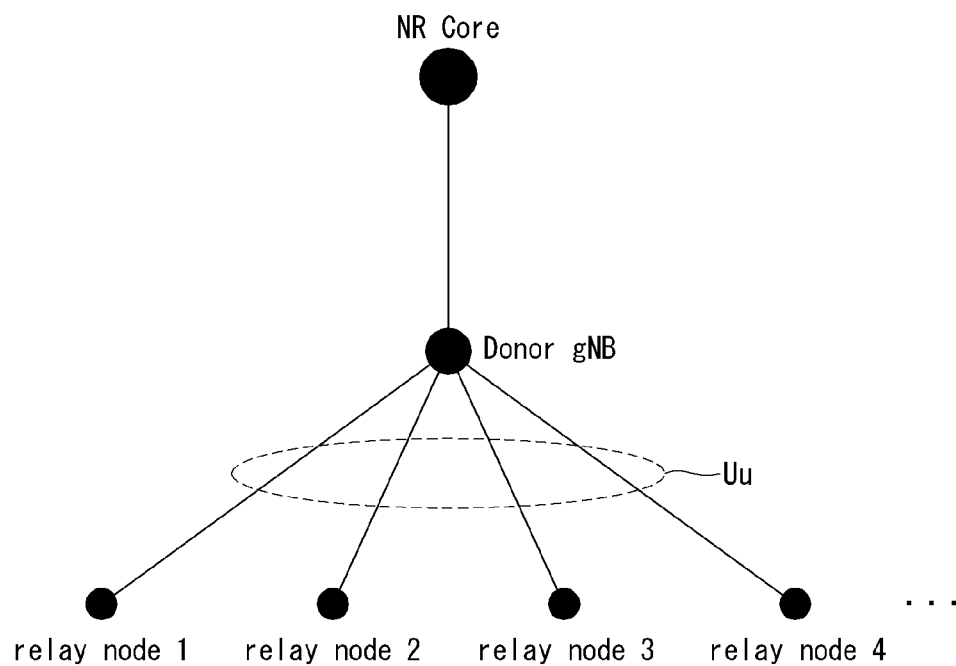
FIG. 13 illustrates an example of an NR network proposed by the present specification.

The second embodiment is performed by the following steps, with reference to FIG. 13. That is, FIG. 13 is a diagram illustrating an example of an NR network proposed in the present specification.

First, the donor gNB is connected to a 5G (or NR) core network, and a number of relay nodes (eg, IAB nodes) are connected to the donor node through Uu.

It is assumed that the PC5 link is not connected between multiple relay nodes.

And, the path reselection threshold for various factors (Uu or PC5) is set at the eNB.

The relay node initiates downlink and/or uplink transmission with the donor gNB via the Uu connection (step 1).

Next, the relay node exchanges assistance information for path reselection with the donor gNB (step 2).

The assistance information may be exchanged periodically or in an event triggered manner.

Next, the RLF occurs on one of the Uu links, and the RLF is detected by a proximity relay node (step 3).

Next, when the RLF is detected, the relay node performs path reselection to initiate reestablishment to recover the RLF (step 4).

If no RLF is detected, an appropriate path may be selected under certain conditions. In other words, let's look at five steps.

If the following conditions are met, the relay node reselects the relay node's relaying path with relay node reselection.

If the 5QI level of bearers established and the data flows associated with it are supported by the node
    If the relay node supports the relevant slice type or specific service
If relay node supports slice/service type such as eMBB
If relay node supports slice/service type such as URLLC
If the relay node supports a slice/service type such as MIoT (or mMTC (massive machine type communication))
If a relay node supports a particular service associated with it
If the allowable delay budget (e.g. PDB (Packet Delay Budget)) is higher than the threshold delay or higher than other neighboring nodes
Congestion level is lower than the threshold or lower than other neighboring nodes If any one of the above conditions is met, the relay node performs a path reselection procedure with the selected relay node (step 6).

Here, the path reselection may be performed in a distributed manner or a centralized manner.

Figure 14:
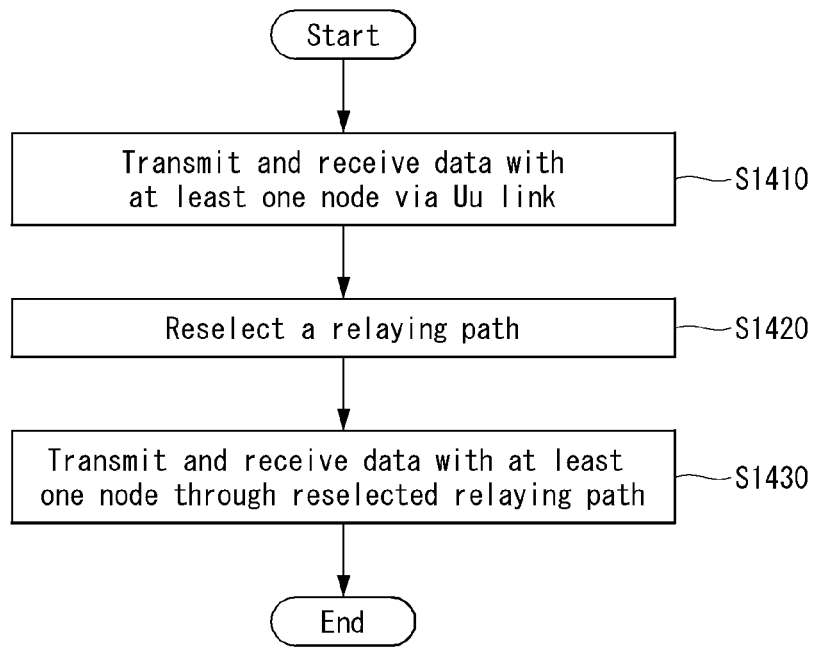
FIG. 14 is a flow chart illustrating another example of a path reselection scheme by a UE proposed by the present specification.

FIG. 14 is a flowchart illustrating still another example of a method for reselecting a path by a terminal proposed in the present specification.

That is, FIG. 14 illustrates a method of reselecting a relaying path by a first node in a wireless communication system.

It is assumed that the first node is connected to the second node through a Uu (UE-to-UMTS) link, and the other node and the PC5 link (or sidelink) are not connected.

For example, the first node may be a relay node and the second node may be a donor node.

In addition, the second node may be connected to a 5G core network.

First, a first node transmits and receives data with at least one node through the Uu link (S1410).

Here, at least one node may mean another relay node.

Next, when a radio link failure (RLF) is detected in the Uu link or a specific condition is satisfied, the first node reselects a relaying path (S1420).

The reselection of the relaying path according to the specific condition may be a case where no RLF is detected in the Uu link.

Here, the specific condition may be whether to support a 5QI level on a node, whether to support a specific service type on the node, or a congestion level of a hop.

For example, the specific service type may be enhanced multimedia broadband (eMBB), ultra reliable low latency communication (URLLC), or massive IoT (MIoT).

Next, the first node transmits and receives data with the at least one node through the reselected relaying path (S1430).

If the relaying path is reselected using a distributed manner, the first node may exchange assistance information with the at least one node.

In this case, the assistance information may be exchanged periodically or in an event triggered manner.

Overview of Device to which the Present Invention is Applicable

Figure 15:
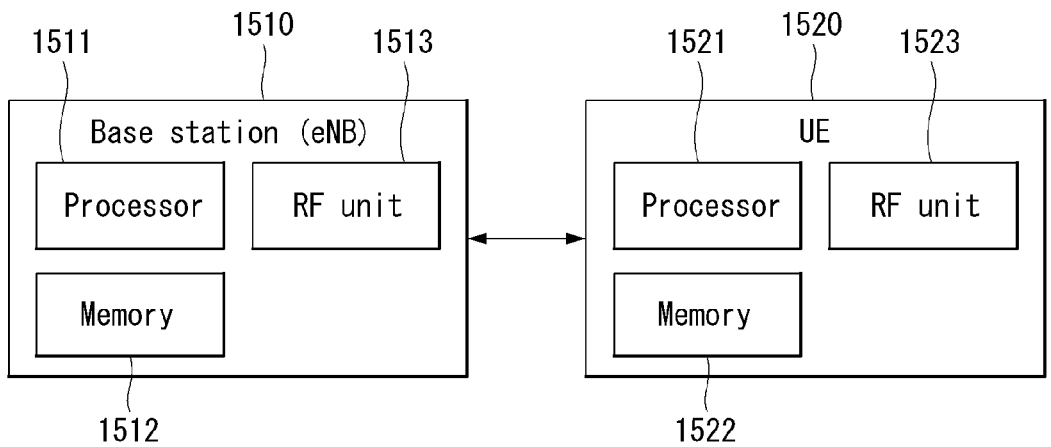
FIG. 15 illustrates a block configuration diagram of a wireless communication device to which methods proposed by the present specification are applicable.

FIG. 15 illustrates a block configuration diagram of a wireless communication device according to an embodiment of the present invention.

Referring to FIG. 15, a wireless communication system includes a base station (or network) 1510 and a UE 1520.

The base station 1510 includes a processor 1511, a memory 1512, and a communication module 1513.

The processor 1511 implements functions, processes, and/or methods proposed in FIGS. 1 to 14. Layers of wired/radio interface protocol may be implemented by the processor 1511. The memory 1512 is connected to the processor 1511 and stores various types of information for driving the processor 1511. The communication module 1513 is connected to the processor 1511 and transmits and/or receives wired/radio signals.

The communication module 1513 may include a radio frequency (RF) unit (or RF module) for transmitting/receiving a radio signal.

The UE 1520 includes a processor 1521, a memory 1522, and a communication module (or RF unit) 1523. The processor 1521 implements functions, processes, and/or methods proposed in FIGS. 1 to 14. Layers of radio interface protocol may be implemented by the processor 1521. The memory 1522 is connected to the processor 1521 and stores various types of information for driving the processor 1521. The communication module 1523 is connected to the processor 1521 and transmits and/or receives a radio signal.

The memories 1512 and 1522 may be inside or outside the processors 1511 and 1521 and may be connected to the processors 1511 and 1521 through various well-known means.

Further, the base station 1510 and/or the UE 1520 may have a single antenna or multiple antennas.

Figure 16:
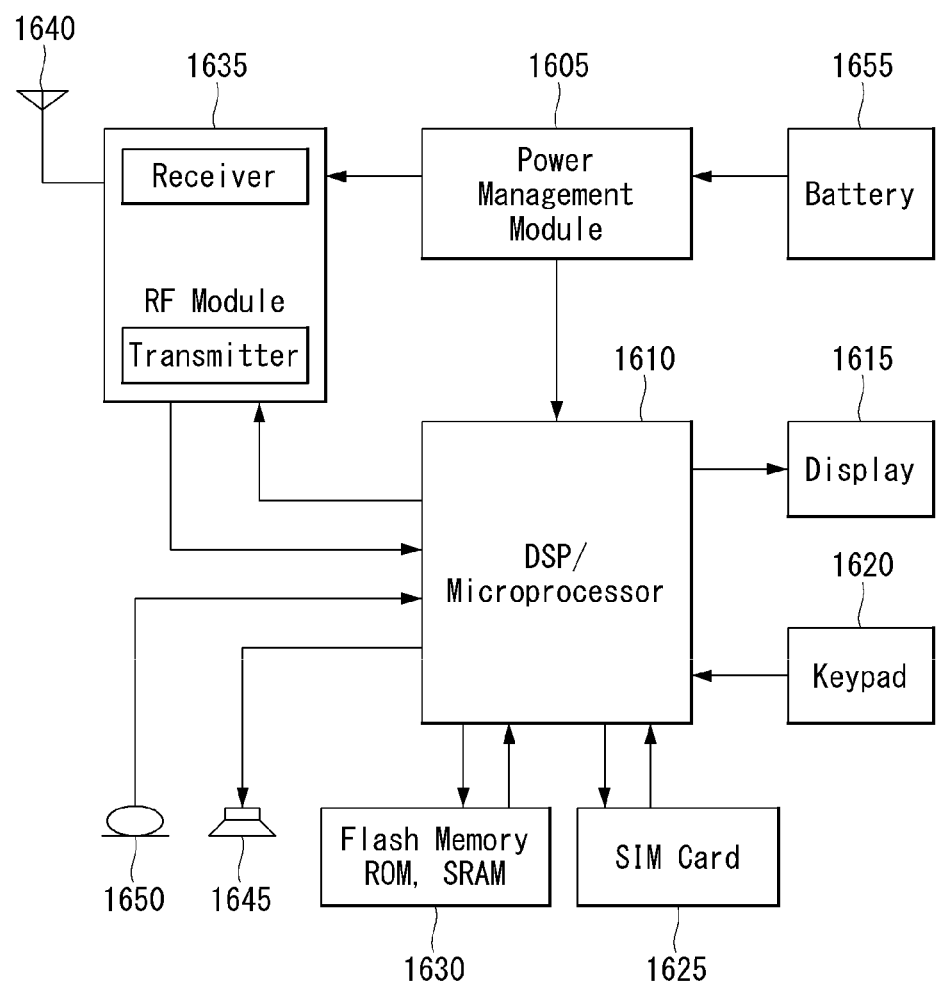
FIG. 16 illustrates a block configuration diagram of a communication device according to an embodiment of the present invention.

FIG. 16 illustrates a block configuration diagram of a communication device according to an embodiment of the present invention.

In particular, FIG. 16 illustrates in more detail the UE illustrated in FIG. 15.

Referring to FIG. 16, the UE may include a processor (or digital signal processor (DSP)) 1610, an RF module (or RF unit) 1635, a power management module 1605, an antenna 1640, a battery 1655, a display 1615, a keypad 1620, a memory 1630, a subscriber identification module (SIM) card 1625 (which is optional), a speaker 1645, and a microphone 1650. The UE may also include a single antenna or multiple antennas.

The processor 1610 implements functions, processes, and/or methods proposed in FIGS. 1 to 14. Layers of a radio interface protocol may be implemented by the processor 1610.

The memory 1630 is connected to the processor 1610 and stores information related to operations of the processor 1610. The memory 1630 may be inside or outside the processor 1610 and may be connected to the processors 1610 through various well-known means.

A user inputs instructional information, such as a telephone number, for example, by pushing (or touching) buttons of the keypad 1620 or by voice activation using the microphone 1650. The processor 1610 receives and processes the instructional information to perform an appropriate function, such as to dial the telephone number. Operational data may be extracted from the SIM card 1625 or the memory 1630. Further, the processor 1610 may display instructional information or operational information on the display 1615 for the user's reference and convenience.

The RF module 1635 is connected to the processor 1610 and transmits and/or receives a RF signal. The processor 1610 forwards instructional information to the RF module 1635 in order to initiate communication, for example, transmit a radio signal configuring voice communication data. The RF module 1635 consists of a receiver and a transmitter to receive and transmit the radio signal. The antenna 1640 functions to transmit and receive the radio signal. Upon reception of the radio signal, the RF module 1635 may forward a signal to be processed by the processor 1610 and convert the signal into a baseband. The processed signal may be converted into audible or readable information output via the speaker 1645.

Figure 17:
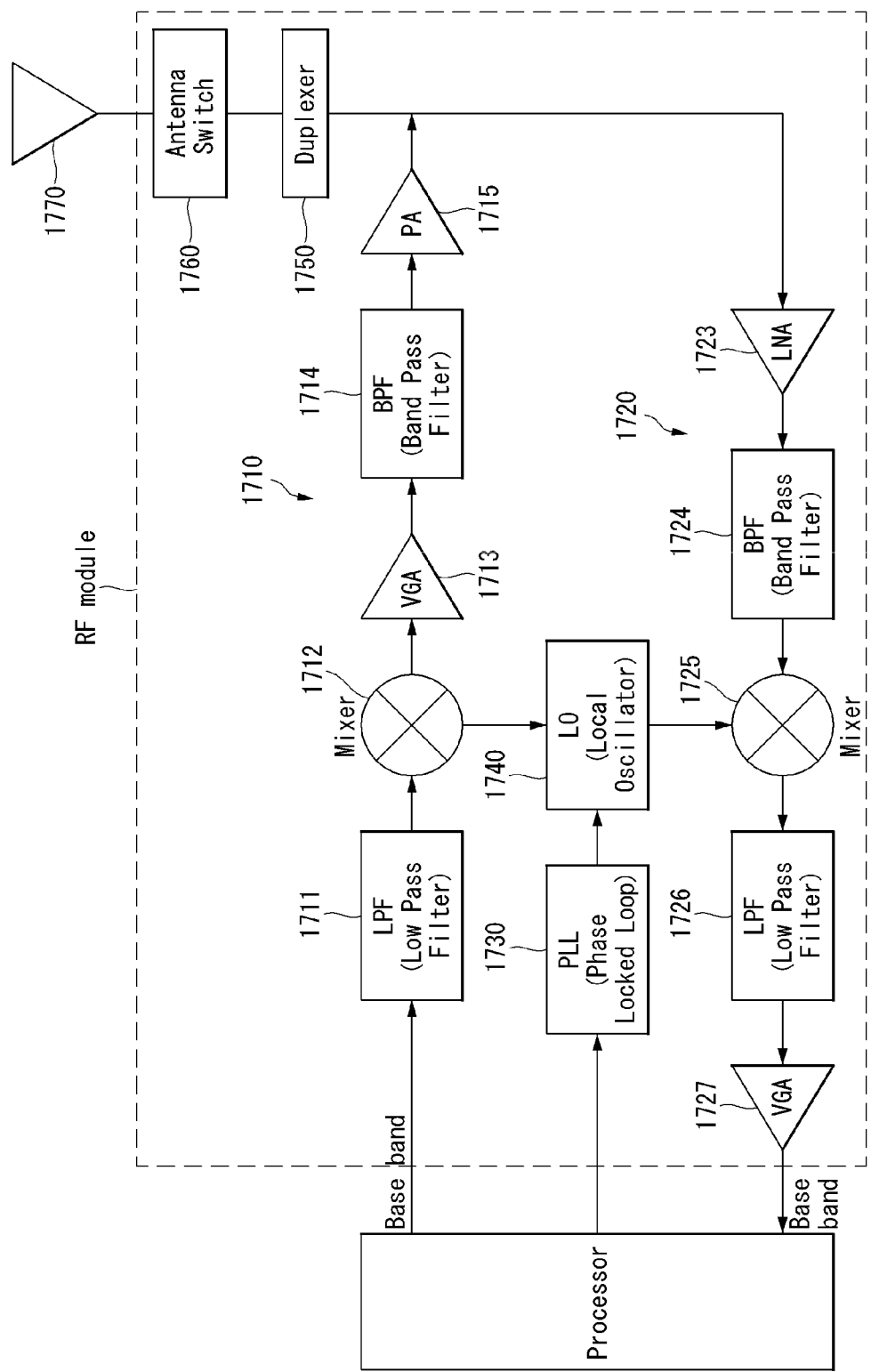
FIG. 17 illustrates an example of a RF module of a wireless communication device to which a method proposed by the present specification is applicable.

FIG. 17 illustrates an example of a RF module of a wireless communication device to which a method proposed by the present specification is applicable.

More specifically, FIG. 17 illustrates an example of an RF module that can be implemented in a frequency division duplex (FDD) system.

First, in a transmission path, the processor illustrated in FIGS. 15 and 16 processes data to be transmitted and provides an analog output signal to a transmitter 1710.

In the transmitter 1710, the analog output signal is filtered by a low pass filter (LPF) 1711 to remove images caused by a digital-to-analog conversion (ADC), is up-converted from a baseband to an RF by an up-converter (mixer) 1712, and is amplified by a variable gain amplifier (VGA) 1713, and the amplified signal is filtered by a filter 1714, is additionally amplified by a power amplifier (PA) 1715, is routed through duplexer(s) 1750/antenna switch(es) 1760, and is transmitted through an antenna 1770.

Further, in a reception path, the antenna 1770 receives signals from the outside and provides the received signals, and the signals are routed through the antenna switch(es) 1760/duplexers 1750 and are provided to a receiver 1720.

In the receiver 1720, the received signals are amplified by a low noise amplifier (LNA) 1723, are filtered by a bans pass filter 1724, and are down-converted from the RF to the baseband by a down-converter (mixer) 1725.

The down-converted signal is filtered by a low pass filter (LPF) 1726 and is amplified by a VGA 1727 to obtain an analog input signal, and the analog input signal is provided to the processor illustrated in FIGS. 15 and 16.

Further, a local oscillator (LO) generator 1740 generates transmitted and received LO signals and provides them to the up-converter 1712 and the down-converter 1725, respectively.

In addition, a phase locked loop (PLL) 1730 receives control information from the processor in order to generate the transmitted and received LO signals at appropriate frequencies and provides control signals to the LO generator 1740.

The circuits illustrated in FIG. 17 may be arranged differently from the configuration illustrated in FIG. 17.

Figure 18:
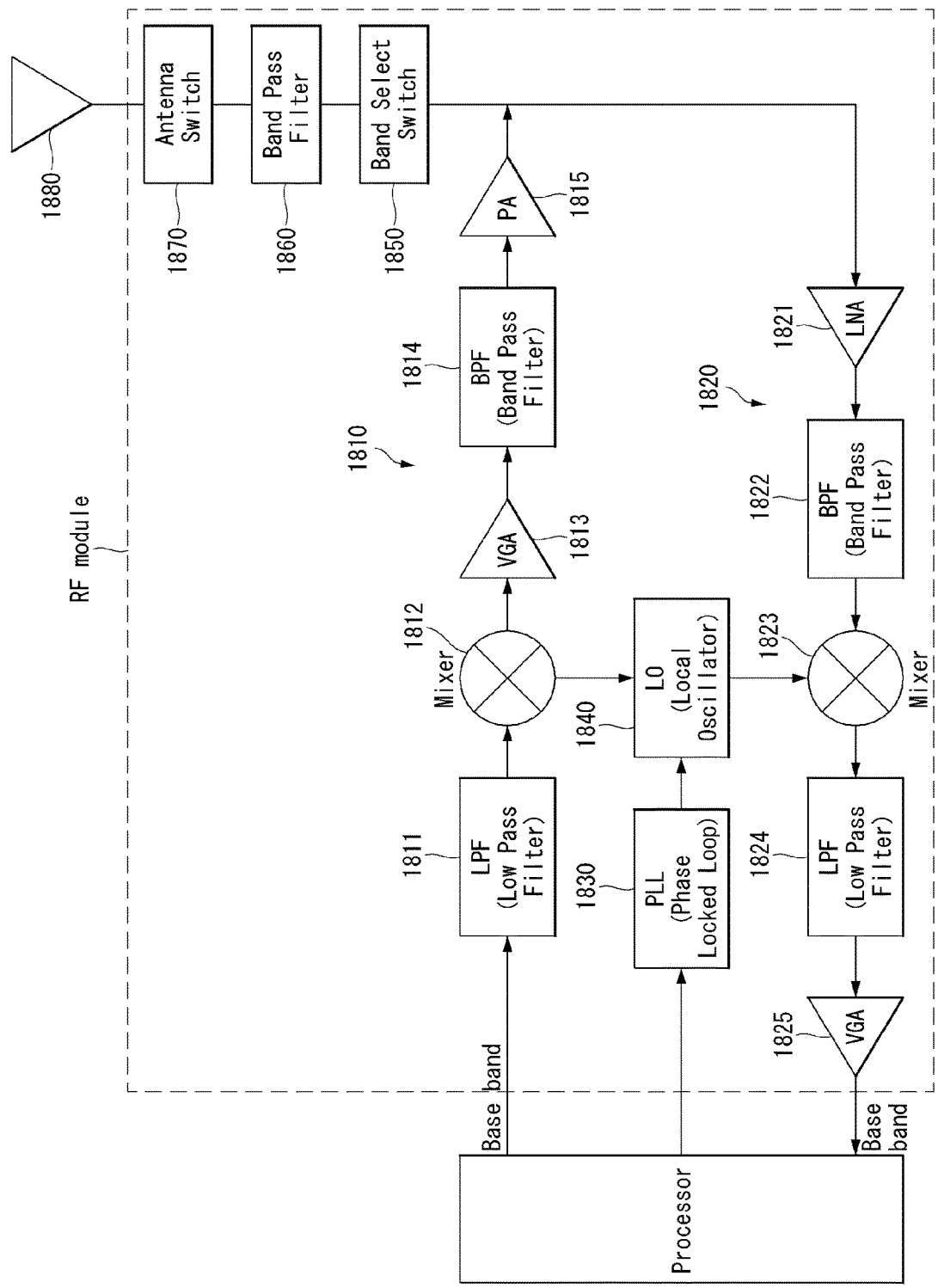
FIG. 18 illustrates another example of a RF module of a wireless communication device to which a method proposed by the present specification is applicable.

FIG. 18 illustrates another example of a RF module of a wireless communication device to which a method proposed by the present specification is applicable.

More specifically, FIG. 18 illustrates an example of an RF module that can be implemented in a time division duplex (TDD) system.

A transmitter 1810 and a receiver 1820 of the RF module in the TDD system have the same structure as the transmitter and the receiver of the RF module in the FDD system.

Hereinafter, only the structure of the RF module of the TDD system that differs from the RF module of the FDD system will be described, and the same structure will refers to the description of FIG. 17.

A signal amplified by a power amplifier (PA) 1815 of the transmitter 1810 is routed through a band select switch 1850, a band pass filter (BPF) 1860, and antenna switch(es) 1870 and is transmitted via an antenna 1880.

Further, in a reception path, the antenna 1880 receives signals from the outside and provides the received signals, and the signals are routed through the antenna switch(es) 1870, the band pass filter 1860, and the band select switch 1850 and are provided to the receiver 1820.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present invention can be embodied in other specific forms without departing from essential features of the present invention. Accordingly, the aforementioned detailed description should not be construed as limiting in all aspects and should be considered as illustrative. The scope of the present invention should be determined by rational construing of the appended claims, and all modifications within an equivalent scope of the present invention are included in the scope of the present invention.

INDUSTRIAL APPLICABILITY

Although a method for performing a path reselection in a wireless communication system according to the present invention has been described focusing on examples applying to the 3GPP LTE/LTE-A system and the 5G system, it can be applied to various wireless communication systems other than the systems.

The invention claimed is:

1. A method for performing, by a first user equipment (UE), a radio link failure (RLF) recovery procedure in a wireless communication system, the method comprising:
   wherein the first UE is connected to a base station via a UE-to-UMTS (Uu) link and is connected to a second UE via a sidelink,
   receiving, from the base station, a threshold for a factor related to a data characteristic of the first UE;
   determining a path for performing the RLF recovery procedure when a RLF is detected on the Uu link,
   wherein the path for performing the RLF recovery procedure is determined through a comparison between the factor related to the data characteristic of the first UE and the received threshold; and
   performing an RRC connection re-establishment procedure for recovering the RLF through the determined path,
   wherein the determined path is the Uu link or the sidelink.

2. The method of claim 1, wherein the factor related to the data characteristic of the first UE is a Qos class identifier (QCI), a packet delay budget, or a priority.

3. The method of claim 1, wherein when the determined path is the sidelink, the RRC connection re-establishment procedure further comprises:
   sending, to the second UE, a request message for requesting a RRC connection re-establishment; and
   receiving, from the second UE, a response message to the request message.

4. The method of claim 1, wherein the first UE is a remote UE, and the second UE is a relay UE.

5. A first user equipment (UE) for performing a radio link failure (RLF) recovery procedure in a wireless communication system, the first UE comprising:
   a radio frequency (RF) module configured to transmit and receive a radio signal; and
   a processor functionally connected to the RF module,
   wherein the first UE is connected to a base station via a UE-to-UMTS (Uu) link and is connected to a second UE via a sidelink,
   wherein the processor is configured to:
   receive, from the base station, a threshold for a factor related to a data characteristic of the first UE;
   determine a path for performing the RLF recovery procedure when a RLF is detected on the Uu link,
   wherein the path for performing the RLF recovery procedure is determined through a comparison between the factor related to the data characteristic of the first UE and the received threshold; and
   perform an RRC connection re-establishment procedure for recovering the RLF through the determined path,
   wherein the determined path is the Uu link or the sidelink.

* * * * *